(12) United States Patent
Burgess, Jr.

(10) Patent No.: US 9,114,695 B2
(45) Date of Patent: Aug. 25, 2015

(54) PERSONAL PROPULSION DEVICE WITH HANDS FREE CONTROL

(71) Applicant: Donald Wesley Burgess, Jr., Ukiah, CA (US)

(72) Inventor: Donald Wesley Burgess, Jr., Ukiah, CA (US)

( * ) Notice: Subject to any disclaimer, the term of this patent is extended or adjusted under 35 U.S.C. 154(b) by 199 days.

(21) Appl. No.: 13/657,113

(22) Filed: Oct. 22, 2012

(65) Prior Publication Data

US 2014/0109283 A1   Apr. 24, 2014

(51) Int. Cl.
*B60K 8/00*   (2006.01)
*B63H 7/00*   (2006.01)

(52) U.S. Cl.
CPC ... *B60K 8/00* (2013.01); *B63H 7/00* (2013.01)

(58) Field of Classification Search
CPC .......... B63H 7/00; B63H 7/02; A63C 17/267; B62K 23/02
USPC ............. 440/1, 6, 37; 114/315; 180/180, 181, 180/182; 244/12.2; 2/69, 88
See application file for complete search history.

(56) References Cited

U.S. PATENT DOCUMENTS

| | | | | |
|---|---|---|---|---|
| 4,189,019 | A | * | 2/1980 | Zech ............................ 180/182 |
| 5,222,569 | A | * | 6/1993 | Martel .......................... 180/180 |
| 5,873,131 | A | * | 2/1999 | Sabin ................................. 2/69 |
| 7,179,141 | B1 | * | 2/2007 | McMullen ...................... 440/37 |

* cited by examiner

*Primary Examiner* — Lars A Olson

(57) ABSTRACT

An improved personal propulsion device that imparts thrust directly to the user when operating a human powered vehicle to improve mobility thereof. The device allows hands free control of thrust magnitude and direction so both hands can grasp and control bicycle handlebars and brakes, watercraft paddles, ski poles or other apparatuses. In another embodiment, the device can be attached directly to the vehicle. The device can be provided with a collapsible shrouded propeller assembly comprising a shroud made up of interlocking panels that are each removably attached to the end of an elongated strut, with each the struts being pivotally and/or telescopically disposed relative to the propulsion mechanism. The panels can be slidably engaged with the struts. A gradiently flexible garment can be worn by a user and utilized with a gradiently flexible fairing attached to the user and a bicycle to improve aerodynamics when riding the bicycle.

18 Claims, 26 Drawing Sheets

PERSONAL PROPULSION DEVICE WITH HANDS FREE CONTROL

CROSS-REFERENCE TO RELATED APPLICATIONS

This patent application is a continuation-in-part of U.S. patent application Ser. No. 12/754,601 filed Apr. 5, 2010, which issued as U.S. Pat. No. 8,292,678 on Oct. 23, 2012, which was a continuation-in-part of U.S. patent application Ser. No. 12/070,182 filed Feb. 15, 2008, which issued as U.S. Pat. No. 7,690,958 on Apr. 6, 2010, which was a continuation-in-part of U.S. patent application Ser. No. 11/477,238 filed Jun. 28, 2006, which issued as U.S. Pat. No. 7,331,833 on Feb. 19, 2008.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

This invention generally relates to personal propulsion devices that are worn on the back of a user or attachable to a moveable object, such as a bicycle, canoe, skateboard or other human-powered vehicle, ridden by the user to propel the user and the object. More specifically, this invention relates to such devices that provide for hands-free operation and control of the device and are configured to accept adjustments for versatility. Even more specifically, this invention relates to various improvements to the configuration of such devices that improve the usefulness and functionality of the device.

B. Prior Art

User-worn propelling devices to propel a person riding on or in a moveable object, such as a bicycle, skateboard, canoe, pair of skates and the like, are well known in the prior art. For instance, the propelling device of Morrill, U.S. Pat. No. 2,456,440, discloses a thrust device that is supported by one arm only. Unfortunately, the user is imbalanced by the offset weight and the center of thrust is in line with the one supporting arm of the user and, therefore, misaligned or offset from the center of resistance of the user's skates, as shown in FIG. 3 of that patent. Torque about the user's vertical axis makes straight line travel and maneuverability difficult. Support of the device by one arm will rapidly become fatiguing to that arm and long duration travel will be uncomfortable or intolerable. The support bar along the side of the user, the gas tank and the throttle appendage in front of the user become a hazard in the event of a fall. The engine is located behind the propeller, thereby increasing the distance from the support and, therefore, increasing the cantilevered weight to the user's arm. Riding a modern bicycle with only one hand is dangerous as two brake handles are provided for safety in traffic. Sitting in and operating a wheelchair requires both hands for steering. The engine would interfere with sitting in the wheelchair. In a canoe or kayak, the engine would interfere with both hands and arms being required for the paddles. An engine speed of 18,000 to 20,000 rpm is dangerous as propellers can and do shatter, which may cause serious injuries to the user and bystanders. Six pounds of thrust is low and insufficient for overcoming inclines and soft snow with heavier users, and slow in watercraft against even a light wind.

The propulsion support unit of U.S. Pat. No. 4,189,019 to Zech, discloses a complex system of levers, springs, turntable and bars on both sides of the users' body. Both hands and arms are required for controls. The unit described with a 25-30 lb. motor, plus frame and support unit, would weigh approximately 40 lbs with the propeller and protection shroud. The frame top terminates in rigid tube ends which during a fall may on contact with the back or sides of the head and neck cause injury to the user. The control bars at the sides of the user present a further injury hazard in the event of a fall. The unit would be impossible to operate on a bicycle, and the position on the user's body would interfere with a canoe, kayak and wheelchair. On snow skis the requirement of both hands and both arms renders the user unable to grip and maneuver the pair of ski poles essential for balance, turning and accelerating over rough terrain. The many parts, heavy weight, high cost of manufacturing, hazardous in a fall, and both hands and arms occupied, make this invention less attractive as an alternative form of transportation.

Zech further discloses a propeller shroud, as shown in FIG. 7. A sufficient body of research has proven the thrust is reduced substantially by shrouding, compared with an open propeller, without including an "inlet lip" of 15% diameter of the shroud (see Modern Propeller and Duct Design by Martin Holtman, 1993, pg 101—incorporated herein by reference). The current invention includes a bumper/flotation device that cooperates with airflow at the inlet end of the containment ring.

The propulsion means set forth in U.S. Pat. No. 5,222,569 to Martel, discloses a device that imparts thrust "solely to the rear of the pelvic area." The propulsion device is supported by a pendulum shoulder harness on the user and must be controlled by both hands on a pair of grips and pivoting handles along both sides of the user. These side handles are an injury hazard in a fall. The device is hanging free on the pendulum harness except for the users hands on the two handle grips, so in the event of a fall when the users hands release the handles to break the fall, the unit can swing around the neck or impact the users head and neck causing injury. The foot starting cable may become entangled around the user causing further injury. The device is located below the axis centered on the pelvic region and the user may not sit in a canoe, kayak, wheelchair or bicycle. Furthermore the users hands would be unavailable to grasp the required maneuvering implements such as paddles, brakes, handle bars, wheels of the wheelchair etc. If the user released the handles to grasp implements the unit would swing out of control causing an impact hazard. The propulsion device does nothing to improve open propeller inefficiencies (see Modern Propeller and Duct Design by Holtman, 1993, pg. 95 and 97—incorporated herein by reference).

The current invention will overcome the above referenced hand and arm requirements. It will allow hands free operation and control of a simple light weight, efficient, economical, device that is adjustable up and down the user's back. The current invention eliminates the need for any side bar for control. This will allow co-operative use with any of the well known transportation or recreational human powered vehicles (HPVs) such as bicycles, kick scooters, wheelchairs, canoes, kayaks, small sail craft, skateboards, all ice and roller skates, snow skis, and etc. In addition, the current invention anticipates use proximate to crowds of people and, therefore, has many safety and convenience improvements.

The light aircraft with inflatable parachute wing propelled by a ducted propeller of U.S. Pat. No. 5,620,153 to Ginsberg, teaches that the efficiency of an aircraft propeller is reduced at low speeds and can be improved by the addition of a duct, comprising support vanes to counter act the torque of the engine, and a propeller or fan centered and mounted rotationally within. The addition of the duct improves safety, reduces noise and improves thrust to power ration. Further study teaches that a ducted fan or shrouded propeller comprises an inlet lip attached and tangent to the duct with a special fan, turbine, or propeller of greater surface area than standard open aircraft propellers of the same diameter. It is known in the art that a very close tolerance between the propeller and the interior surface of the duct, 0.015 inch maximum up to an 18 inch diameter propeller is required. This close tolerance requires stiffened duct and vane arrangement and the cost of the composites and manufacturing of them, to stiffen the unit and retain the light weight features required in aircraft is prohibitive for a personal propulsion device. The rpm is also increased in a ducted fan and results in an unacceptable blade failure risk proximate to crowd and children on bicycle paths, sidewalks, and boardwalks for ground transportation.

The current invention overcomes the dangers of the ducted fan and the prohibitive cost of the rigidity required and the lack of availability of ducted fan parts in the required sizes. The inlet lip is of a complex increasing radius design which also increases design and manufacturing costs (see Modern Propeller and Duct Design by Holtman, 1993, pg 101 and 102—incorporated herein by reference).

The current invention improves the efficiency of the open propeller and improves the personal propulsion device safety using commonly available materials of very low cost and weight. The manufacturing processes required are simple and inexpensive. The propellers required are commonly available for large model aircraft in wood, plastic, fiber reinforced nylon, and other materials. The diameters and pitches are diverse and can be adapted for use in the current invention for any rpm, size user, or horsepower required in a two, three or multiple blade configuration.

The recoil rope type manual starters that are standard in the industry have been improved to be operable from the user position. Tezuka et. al, U.S. Pat. No. 6,776,133, discloses a starter extension that is pulled along side the operator in the standard working position. None of the prior art machines adjust slidably up high on the users back and down low on the users back. This wide variation in propulsion device positions on the user, would dispose the starter handle in the region of the arm pit at its high adjustment. This position removes the strength and leverage advantage of the operators arm, against the load, due to the inconvenient position. The various positions on the users back facilitated by the current invention, would place the fixed end of the flexible tube and its fixing bracket, as shown in FIG. 3, in the path of the swinging arm or elbow of a canoe paddler or snow skier. The rigorous anticipated and intended uses of this current invention require free motion and unobstructed use of arms and elbows through their full range of motion, without chance of impact or contact with any part of the propulsion device. My current invention will over come the limitations and injury hazards of the prior art recoil starters.

The prior art of personal propulsion means attached directly to the user has resulted in heavy, slow and generally inefficient devices. One or both of the hands and arms are continuously required for control of these devices. There are handles and appendages that create a safety and/or injury hazard to the user in the event of a fall. The devices lack sufficient adjustments in position on user, and thrust angle to provide wide versatility in cooperation with the many HPVs available today. As a result, presently there are no personal propulsion devices that are widely available on the market, therefore, the public has benefitted little from the prior art devices.

As freeway, street, and parking lot crowding increase, the demand and cost of fossil fuels are at a record high world wide. Pollution from auto emissions is an increasing concern of the public and the global warming awareness is on the increase. The dependency of the United States on foreign oil and the consumption of world wide petroleum reserves will create new record high prices. Emerging countries' fuel demand in conjunction with the aforementioned pressures, point to ever increasing prices and ever tightening supplies.

A need exists for a compact, extremely low fuel consumption, user friendly, hands free operation, light weight, low emissions, unlimited range (with occasional refueling at any gas station) alternative transportation device. This need for alternative transportation is recognized widely as bicycle paths and designated bicycle lanes on streets and roads are being built at great cost and prompted aggressively. This is occurring in large cities and small towns alike, as the negative impact of too many automobiles is pervasive. The popularity of HPVs is at an all time high. The range of HPVs has always been limited by the endurance of the user and thereby eliminating much of the public from benefitting from such devices.

The massive competition in the lawn and garden equipment market has resulted in rapid and major improvements to the motors, which improvements directly benefit the present invention. One of these improvements is reliability, with motors being able to provide up to 2000 hrs of trouble free use. Another improvement is emissions reductions, which resulted from public and community awareness of pollution from small engines (especially two-strokes where oil is premixed with gas). This has resulted in, typically in cooperation with state air resources agencies, tightened standards of compliance among small engine manufacturers. User friendly features are now major selling points such as lighter weight and high power, for instance currently a 2.2 hp totally self-contained motor weighs only nine pounds. Other features include a fuel primer bulb for first pull and easy starting, all position running, quieter mufflers, regular gas required with greater fuel economy and less vibration to the user.

The current invention benefits from the motor configuration of the increasingly popular string trimmer. There are many manufacturers to select from. There are many power options and option packages to select from. A size and weight range of the present invention can be offered to the public to accommodate various sizes of users. The operator of the string trimmer benefits from the vibration isolation bushing between the engine and drive shaft housing and the current invention will benefit also.

For the rest of this document the term string trimmer motor is implied to comprise the standard, widely available string trimmer motor which is totally self contained. It includes a centrifugal clutch so at an idle condition the load is at rest. It includes a leak proof all position fuel tank. It includes a recoil rope starter. It includes a vibration isolation bushing between the motor and the drive shaft housing tube. It includes a muffler and or catalytic converter and or spark arrester as local regulations require. It includes a carburetor having a fuel primer squeeze bulb, a convenient choke, a throttle, and an air filter. It may be of either the two stroke, more noisy and requiring premixed oil in the gas, but is lighter, or the four stroke, quieter, less exhaust emissions, uses regular gas but is heavier per horse power. These motors have smooth exterior cowlings and are air cooled. Noise awareness is on the increase worldwide.

Excessive noise associated with operating equipment, machinery, vehicles and other devices is generally considered to be noise pollution in the United States is increasingly regulated by many local, state and federal agencies. A personal propulsion device utilizing a propeller generally has the propeller positioned close to the user's ears and often in close proximity to bystanders. As such, propeller noise is of particular importance to such a device and its users and the public at large. A fixed-pitch propeller is preferred for this application due to its low cost, low weight, and low maintenance required. Fixed-pitch propellers will be considered for this invention while acknowledging that a light weight variable pitch propeller may be incorporated in combination with this invention.

Testing of propeller thrust versus noise levels indicates that significant reductions in noise by modern reduced noise propeller designs results in a corresponding or greater percentage loss in propulsive efficiency (in the twelve inch diameter to twenty inch diameter size range tested). It is broadly understood that the region nearest the propeller tips, having the greatest velocity, generate the greatest noise. The need exists for a light weight propeller/shroud system that can be controlled to minimize noise while still producing thrust, even at a reduced thrust level and power to thrust ratio.

The largest component of any ducted fan/shrouded propeller is, necessarily, the duct/inlet lip and propeller combination. Although there are many folding propellers on the market today that are suitable for use with personal propulsion devices. The large size of the duct and inlet lip combination make these personal propulsion devices difficult to ship, portage and store. As can be readily appreciated by persons who manufacture and utilize such devices, it would be beneficial to provide a personal propulsion device having a duct with a means that allow it to be disassembled or collapsed to overcome the significant problems associated with their large size. Presently, no such duct is available. The development of relatively exotic materials, such as aromatic polyamides, graphite and gel-spun UHMWPE fibers, for use as reinforcement fibers allow the use of lightweight, interlocking duct panels that provide the rigidity and durability required for use in demanding applications, such as personal propulsion devices. The use and composition of these materials, as well as many others, are evolving rapidly and will allow usage of these materials in applications that were formerly only reserved for high technology application, such as aerospace and the like, but which are now affordable enough for use with household items and, with regard to the present invention, for use with personal propulsion devices.

Material selection for a device, such as a personal propulsion device, having widely varied mechanical properties generally requires fastening together a number of different materials, each for a specific quality of rigidity, one for flexibility, one for colorability, one for weather proofing or water proofing and another for user comfort. The age-old method for building such devices generally requires many patterns, parts and fasteners, and the strength is generally limited by the weakest material in the system or material separation at the points where fasteners penetrate the material. The need exists for a material that can have widely varied mechanical properties imparted to various areas, ridged and strong in some areas and flexible in others and elasticity/stretchability in yet other areas, all from a single piece of material.

SUMMARY OF THE INVENTION

The current invention generally is worn on the users back to impart thrust to the user to assist traveling on any bicycle, skates, skies, canoe, kayak, wheelchair or other HPVs. The device is adjustable slidable higher and lower on the users back to accommodate the aforementioned vehicles/apparatuses. The personal propulsion device allows hand free control of thrust magnitude so the user can grasp and operate any maneuverability or safety controls of above mentioned apparatuses, continuously, while simultaneously controlling said propulsion device. Adjustments of the thrust direction of the propulsion device allow the user to stand oblique to the direction of travel as on a snowboard or skateboard and deliver thrust inline with the direction of travel. The user can lean forward on a bicycle on a racing position to improve aerodynamics and comfort and the device can be adjusted to deliver horizontal thrust. Thus the reader can see that the user can travel economically and effortlessly on any HPVs or apparatus' for reducing locomotive effort.

By redirecting the infeed air from the outer propeller region toward the mid region and starving the tips, the most intense noise source will be minimized while still generating thrust from the slower moving mid region. The system can then be restored to maximum thrust and efficiency when away from bystanders, in the open, or whenever appropriate. My invention and method accomplish this noise reduction on demand then fully restoring to full thrust either while "on the fly" or by presetting.

The gradient flexibility and gradient stretchability method of the present invention allows areas hardened into an aerodynamic frontal nose cone mounted to the front of a bicycle to transition gradiently to a soft stretchable wearable garment for the bicycle rider, all in one piece of material. Another example of the need for gradient flexibility is the personal propulsion device inlet guard air horn. The area at the trailing edge must be rigid and with sufficient strength to attach and support the entire horn, but the radius area is semi-flexible to allow the warping of the leading edge to move toward the duct inlet lip. Additionally the air horn leading edge must be very rigid and strong. As such, the gradient flexibility and method of the present invention for creating such components allows new and exciting design possibilities and uses from a single piece of material.

Another example is aero-shaped garments that can improve PPV rider speed and reduce fatigue and thereby extend a riders' range and PPV usefulness. Also incorporated in the semi-rigid aero-shaped garment, using gradient flexibility is a large crush zone to improve rider safety in the event of a crash, all from a single piece of material. Aero-shaping using gradient mechanical properties has applications in garments for runners, snow skiers, hang gliders, and everywhere aero-shaping is beneficial. Gradient rigidity in garments will be incorporated into sportswear for improved safety for vulnerable areas of the person and more rigidity is designed into those areas. Conversely, at the joints of the wearer, gradient flexibility results in the most stretch where it is required for freedom of movement and comfort.

Accordingly, a number of objects and advantages of my invention are readily apparent from the above and the detailed description set forth below. For instance, the user of the present invention enjoys hands free control of the thrust magnitude imparted generally to the users back from no thrust to full thrust and any magnitude between these limits. In addition, the user enjoys the freedom of arms and hands free movement while operating the personal propulsion device without any control bars or protrusions extruding from the frame along the users sides, thereby improving safety in the event of a fall. The present invention can be adjusted high on the users back so the user can sit comfortably in a canoe, kayak, wheelchair or other HPVs and use both hands to freely paddle or maneuver, or break each with hands and arms unencumbered. In addition, my invention is light weight balanced and comfortable and can be used for hours without fatigue or discomfort.

The present invention includes an impact absorbing bumper around the circumference of the propeller to cushion the shock of impact imparted to the user and device in case of a fall. The bumper is light weight and acts as a floatation feature to give the device positive buoyancy incase user falls into the water during water craft use.

The present invention is adjustable to the middle of the user back to allow comfortable bicycle riding with both hands free to shift gears, operate both brakes and maintain both hands on the handle bars. An adjustment allows the user to lean forward into the racing position for comfort and improved aerodynamics and the device delivers horizontal thrust.

Another improvement incorporated in to the personal propulsion device of the present invention is that it is adjustable rotatably about the vertical axis of the user to allow user to stand oblique to the direction of travel as on a skateboard or snowboard and deliver thrust inline with the direction of travel. As such, the users' hands and arms are free for improved balance, to allow the user to safely grab objects or to break a fall.

The personal propulsion device of the present invention can be configured to push the user along at 25 miles per hour or greater on a standard road bicycle while achieving 150 miles to the gallon of regular gasoline without pedaling. It is believed that performance and efficiency will improve with continuing research and development.

Another benefit of the present invention is that it allows the user to start the device from the users' position so user stops the motor without remorse. This saves fuel at long traffic lights and promotes good will while coasting by crowds silently on boardwalks or street fairs etc. and when the noise even at idle would be offensive.

The personal propulsion device of the present invention allows the user of a wheelchair significantly increased range, and as a result freedom, with the assistance of thrust while hands free control facilitates both hands on the wheels for steering and braking.

Another benefit of the present invention is that it allows the user to purchase and operate the unit for transportation at an overall cost far less than other transportation means and yet enjoy unlimited range of travel. The user benefits from economical and effortless locomotion.

Yet another benefit of the present invention is that it is configured to allow the user to control the noise level of the propulsion device to a minimum without completely turning the device off. This feature addresses the high noise level long known to be a problem with any propeller-driven device.

The personal propulsion device of the present invention allows a method of creating gradient flexibility and gradient stretchability necessary in specialized material applications from a single piece of material. Gradient stretchability and gradient flexibility are necessary to make light-weight inexpensive air horn guards, specialized bicycle fairings (partial or complete) aerodynamic garments, airbags and virtually endless additional applications.

Yet another benefit of the present invention is that it allows the creation of a geometric shape, then fixing it into the shape for use as an end use part or with additional stiffening for use as a production mold.

The present invention allows the use of a gradient stretchability bicycle fairing to greatly reduce bicycle and rider aerodynamic drag. The specialized fairing conforms to a large range of bicycles, riders, and rider positions and will be of great advantage to any cyclist with or without the use of a propulsion device.

The present invention allows the user to quickly and easily collapse the duct, detach the propulsion module, remove the folding propeller and fold the personal propulsion device down to much smaller and more manageable size. When collapsed, all of the propulsion module components fit neatly into a small storage compartment attached to the power module. The components can be easily and quickly reconfigured to provide a stable and easy to operate personal propulsion device.

The above and other aspects, objects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures that are included herewith generally describe and show certain uses for the personal propulsion device and materials that can be used to manufacture various components of the device, persons who are skilled in the art will readily appreciate that the present invention is not so limited.

Figure 1:
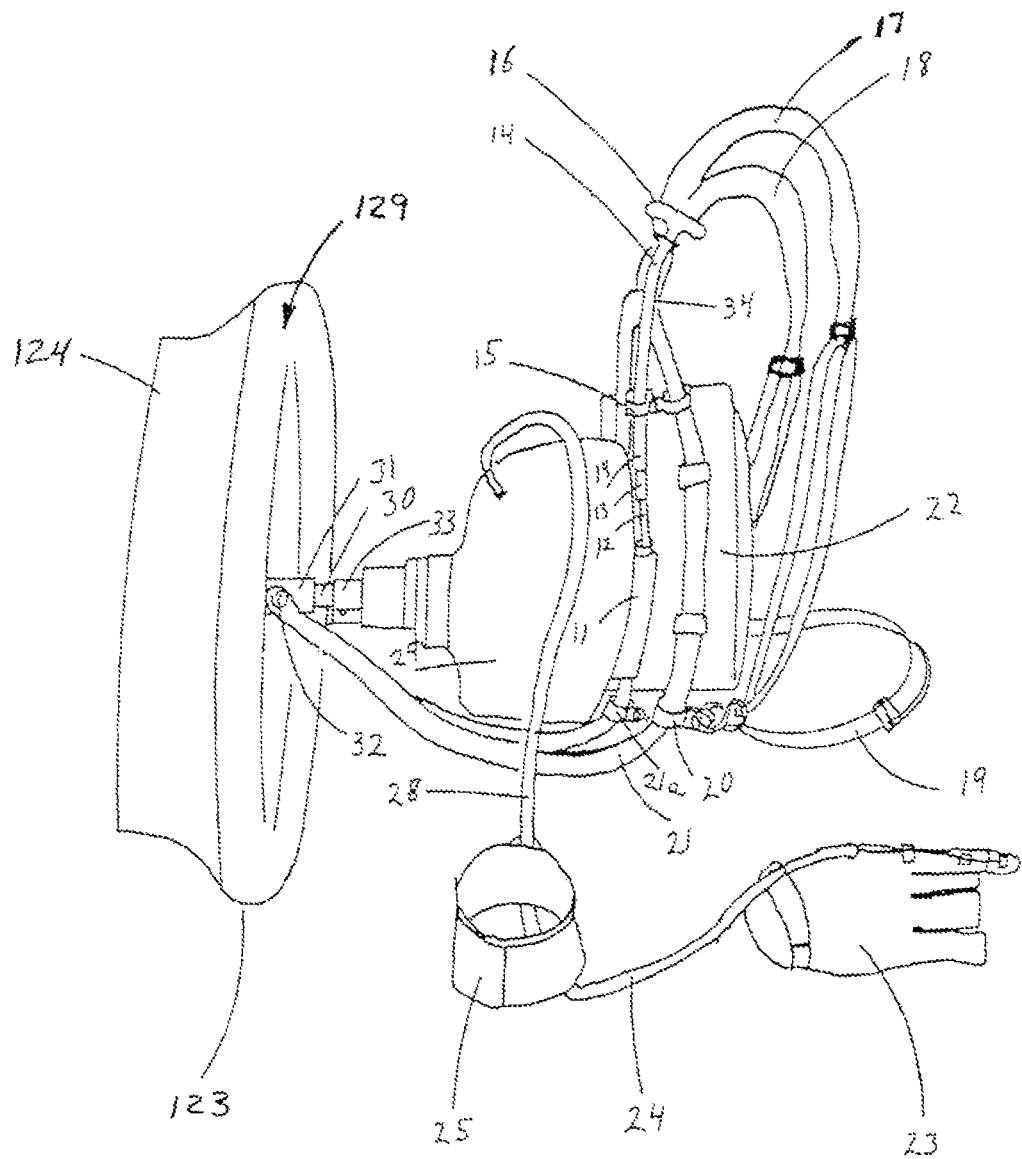
FIG. 1 is a side view of a Personal Propulsion Device configured according to a preferred embodiment of the present invention.
Figure 3:
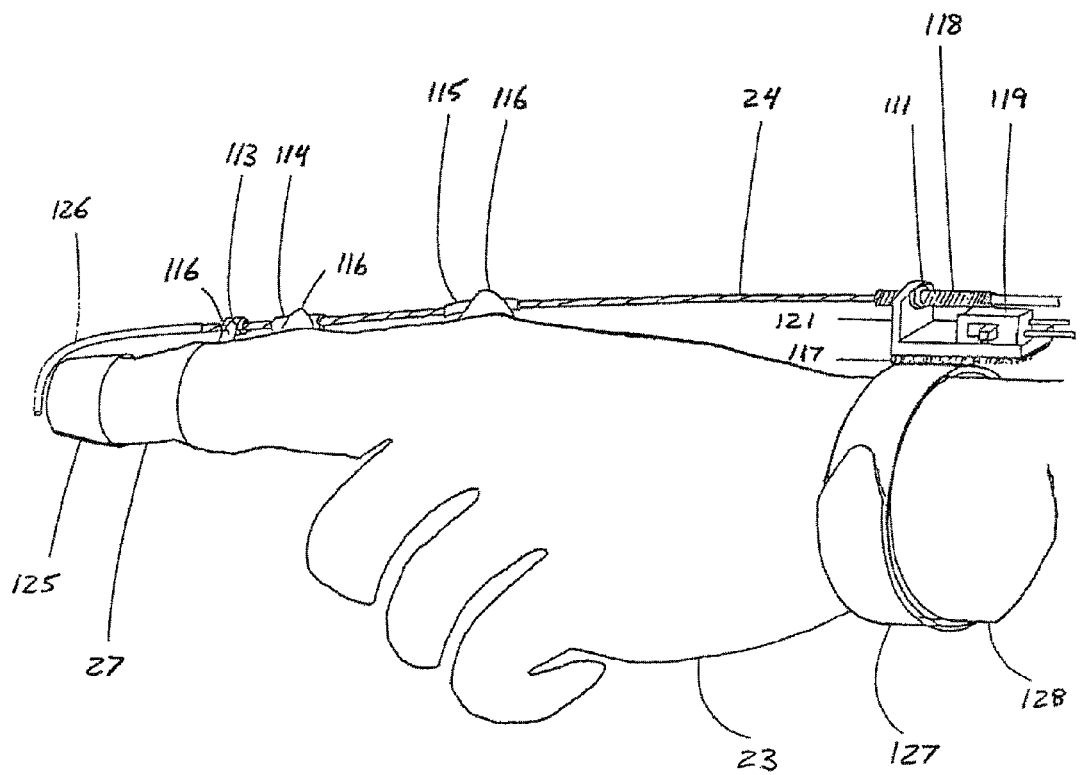
FIG. 3 is an isolated a side view of the throttle control glove shown on the hand of a user.

As shown in FIG. 1, in a preferred embodiment of the personal propulsion device 11 of the present invention the motor 29 contains a vibration isolated motor mount clamp 33 and is secured to the propeller shaft housing tube 30. The pivot block 31 slides onto the propeller drive shaft housing tube 30 and is clamped securely by tightening pivot block bolt 32. The pivot block 31 is attached to a light weight aluminum frame 21 with the pivot block bolt 32. As the pivot block bolt 32 is tightened it secures other parts, shown in detail in FIG. 11, simultaneously. A comfort pad 22 is secured to frame 21 and padded adjustable shoulder straps 17 and 18 are attached to the top of the frame 21 and secured to bottom of frame 21 with clamps 20 and 20a. The adjustable waist belt 19 is also attached to clamps 20 and 20a. The throttle control glove 23, which is shown in detail in FIG. 3, is connected to the motor 29 using a standard throttle cable 24 and ignition switch in general use today as small engine controls.

The flexible over-the-shoulder recoil starter extension 34 comprises a flexible spring like housing 14 with a friction reducing plastic tube liner 13. The recoil starter rope 12 is extended or replaced with a new rope 12 of sufficient length to accommodate the extension 34. The rope 12 passes through tube 13 and is attached to pull handle 16. The extension assembly 34 is secured to the frame 21 with clamp system 15. This flexible and extended started improvement allows the starter 34 to conform to the padded shoulder strap 18 when the starter extension 34 is attached to the strap 18. This allows easy access to the starter handle 21 when the device 11 is adjusted high on the user's back or low on user's back, as shown in FIG. 2.

At the bottom or motor end of the starter extension assembly 34, open rope 12 remains open and the housing flexible to allow the motor 29 to be pivoted at the pivot block 31 and still be pull started while misaligned relative to the frame 21. Both ends are free and flexible to allow adjustments at both ends of the starter extension assembly 34.

The flexible over the shoulder recoil starter extension 34 is an improvement that other power equipment in use today will benefit from. For example, the backpack leaf blowers of the gasoline motor type have to be removed from the user to be started but with this improvement can be started from the user position. This feature improves convenience and allows stopping the motor without hesitation or remorse which conserves fuel and reduces unnecessary emission and pollution.

Figure 2:
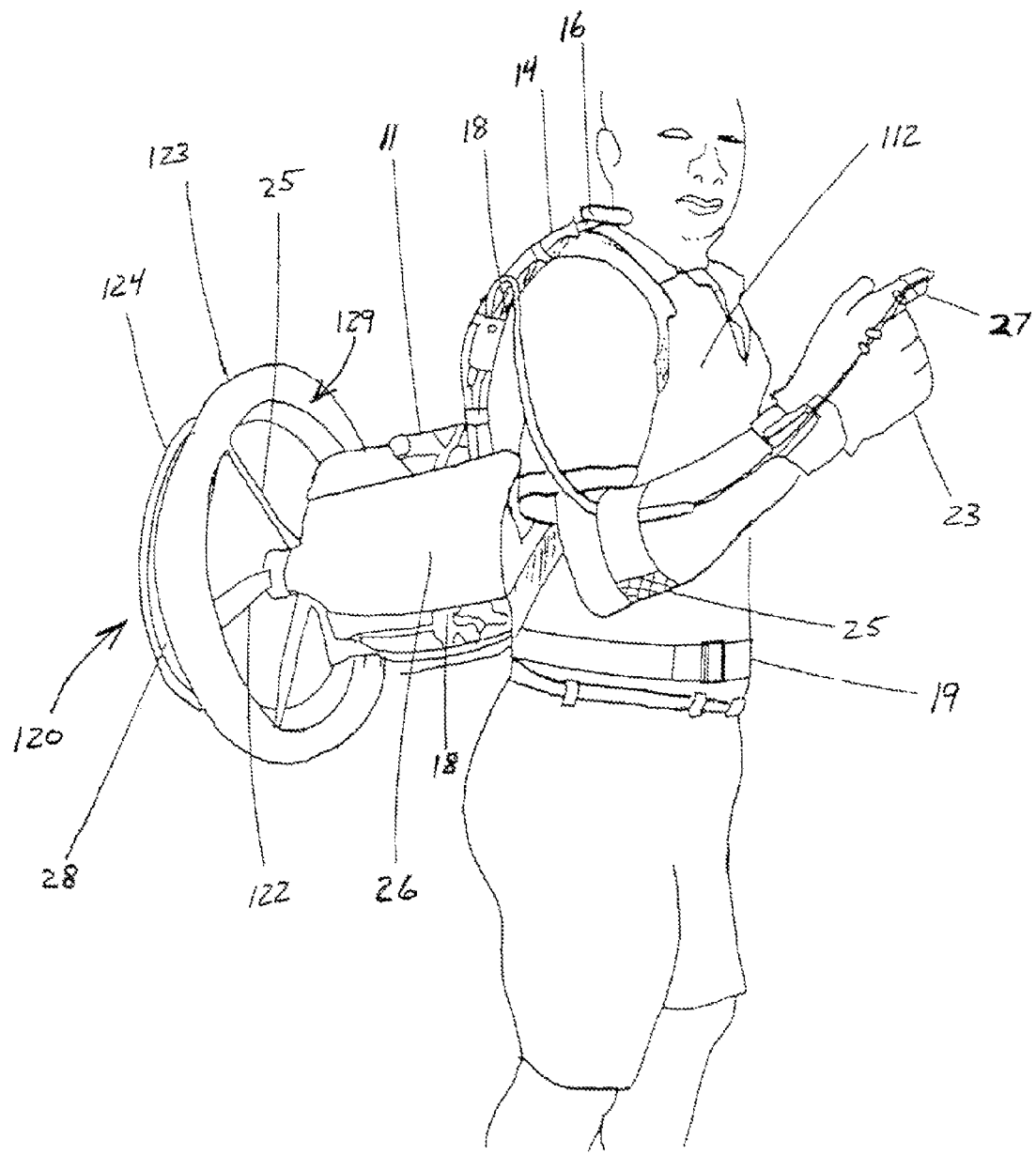
FIG. 2 is a side view of a Personal Propulsion Device of FIG. 1 shown on a user.

In FIG. 2, the Personal Propulsion device 11 is in the middle to lower back position and viewed from the right side of user 112 to show the throttle control glove 23 on a right handed user. The throttle cable and run/stop switch wires are bundled together and attached to the user at the throttle control glove 23, the elbow adjustable cable strap 25 and at the right shoulder strap 18 before it enters the motor 29. A metal screen, not shown, is attached to the rear of the propellers shroud inlet lip 123 securely. These safety screens, not shown, if removed, will open a micro switch in series with the run/stop switch and immediately disables the motor 29 so it can't be started with the safety screens removed.

The shoulder straps 17 and 18 are similar to the backpacks and leaf blower available currently but with greater length of adjustment to allow the user to shorten them by buckle adjustment to raise the personal propulsion device 11 high on the back for canoe, wheelchair use or etc. The waist belt 19 is designed to attain the alignment of the unit 11 with the direction of travel and can be adjusted to fit securely to various sized users. The waist belt 19 also secures the personal propulsion device 11 in position relative to the user's body in case of accidental fall.

The over the shoulder recoil starter extension 34 and recoil starter pull handle 16 are positioned for ease of starting with either hand. When operating the personal propulsion device 11 in near proximity to other people, stopping the motor and coasting silently by and easily restarting on the go is desirable.

The user 112 stands or sits in or on any wheeled mode of transport or in the water in any water craft or on ice skates, snow skies or other HPVs. The user starts the personal propulsion device 11 by pulling the starter handle 16, then flexes or curls the index finger of the throttle/control glove 23 to increase propeller speed and forward thrust until desired speed is achieved. The index finger 27 can then be relaxed slightly to reduce thrust to maintain desired speed and cruise for fuel efficiency.

The right fender 26, shown in FIG. 2, is attached to the frame 21 with simple clamps to help smooth the airflow around the user and draw air into the propeller 122 more smoothly. The corresponding left fender is not shown, but acts and is attached in the same manner as the right fender 26 to smooth air flow and improve the look of the unit 11 as well as provide space to advertise, affix logos, and attach night lights or reflectors for improved visibility and to display manufacturer contact information. The fenders 26 also smooth the sides of the device 11 where the user's arms and elbows are most likely to contact the device 11 during vigorous paddling etc.

The shroud 124 around the propeller 122, the inlet lip 123, and shroud support struts 25 comprise the shrouded propeller assembly 120. The assembly 120 is lightweight, strong, and aerodynamically efficient in horsepower to thrust ratio, and relatively economical to build.

The high cost of ducted fans, turbines and the high rpm required, creates hazards in fan or turbine failure and resultant explosion of parts. This makes operating these devices in close proximity to user's body and around others undesirable. An aluminum containment ring 28 is attached around the plastic shroud 124 in line with the propeller 122 tip line of travel reinforcing the shroud 124 against penetration of propeller parts in the event of propeller failure. Common rivets or screws with aircraft type locknuts should be used here to avoid parts loosening and contacting the propeller 122 when it is in motion and, as a result, becoming projectiles.

As best shown in FIG. 3, the user 112 slides on the throttle control glove 23 until the adjustable wrist anchor strap 127 is around the small of the user's wrist 128. The user 112 then adjusts the wrist anchor strap 127 firmly to limit motion of throttle cable housing anchor plate 121. Placing the finger end cap 125 onto the end of the index finger 27 of the user 112 enables the curling or bending of the index finger 27 to tension and draw the throttle cable 24 through the knuckle guide bushings 113, 114 and 115 to advance a typical throttle plate of any typical motor carburetor. This finger flexing controls the motor, speed, torque, and propeller thrust imparted to the user 112. Additional flexing advances the throttle farther and increases the thrust from the motor 29. With throttle control glove 23 on the user's hand the run/stop switch 119 is switched to the on or run position. The motor 29 can be started in the backpack position or on the floor or table top to first warm it up, usually requiring activation of a carburetor choke briefly and only during the initial start of the use as a warm motor require no choke for starting. During the rest of the warm motor use the motor 29 can be started, stopped, and restarted from the backpack user position with the over the shoulder recoil starter extension 34. The throttle cable guide bushings 113, 114, and 115 are made of low co-efficient of friction material, such as a plastic tubing or the like which, allows some flexing across the users knuckles as the index finger 27 is flexed.

The throttle cable guide bushings 113, 114, and 115 may be attached to the throttle control glove 23 by an epoxy adhesive 116. The throttle cable 24 tension can be adjusted by changing the position of the throttle cable housing anchor plate 121 on the wrist anchor strap 127 with a hook and loop material attached to each of said parts to accomplish a course adjustment. To accomplish a finer throttle cable 24 tension adjustment the throttle cable housing stop tube 118 is turned through threads in the throttle cable anchor plate 121 after loosening lock nut 111 and retightening the lock nut after adjustment is satisfactory. The course adjustment described above also helps accommodate the various sized hands of users and the throttle control glove 23 will be offered in various sizes. The glove 23 is detachable at the motor wire plugs, not shown, and the cable 24 is easily detached at the throttle plate 121. This detachability allows interchangeability for color coordination or to allow users of different sizes to use the same propulsion unit. Many gloves 23 may be retained for the winter, summer, reflective, night riding etc.

The throttle cable 24 is crimped to a malleable tube 126 such as brass and swedged onto the throttle cable 24 and conformed to finger end cap 125 and maybe attached to finger end cap 125 with adhesives or brazing the tube 126 to a metal finger end cap 125 made of metal such as a sewing thimble. The finger end cap 125 may have inserts of various sizes to accommodate various users. The throttle control glove 23 may be improved to include the carburetor choke control and other functions. The throttle control glove 23 may be right or left handed and may utilized only one finger to hot weather use. The throttle control glove 23 may be of breathable material for user comfort and a stretchable material to accommodate different sized user hands.

The throttle control glove 23 may employ only an electronic wireless signal transmitter with receiver servos on the motor 29 to control as many functions as desired. These wireless remote controls have been in use for many years in hobby model cars and aircraft and are currently small, lightweight, reliable and inexpensive. The throttle control glove 23 may be detachable, to allow interchanging for different users and different seasons. The glove 23 can be detached and taken with the user 112 to disable the personal propulsion device 11 to discourage theft, similar to an ignition key for an auto. As these controls continue to improve, the personal propulsion device 11 may be able to be controlled with eye lid motion, mouth motion or other controlled inputs. With the preferred embodiments of the present invention, the user can enjoy the use of any vehicle with full grasp of both hands and thereby be safe while operation any transport device.

Figure 4:
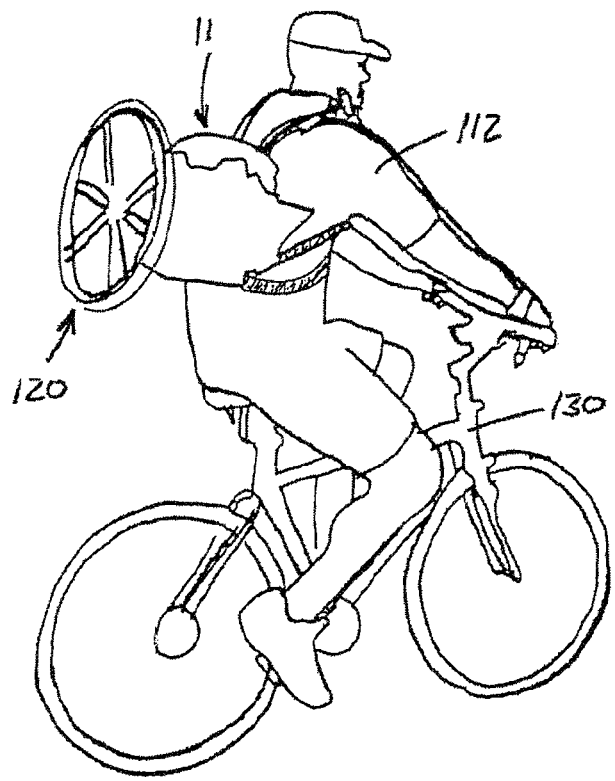
FIG. 4 is a side view of the Personal Propulsion Device shown on a user riding a bicycle in a n upright position.

In FIG. 4, the user 112 is shown on bicycle 30 in the common upright sitting position for bicycle riding and has adjusted the personal propulsion device 11 to the middle of the back position. The user 112 may, at times, dismount from the seat to the standing position, straddling the top bar of the bicycle with feet positioned on the ground. In the standing position the propulsion device 11 will still be clear of the seat and rear tire.

Figure 5:
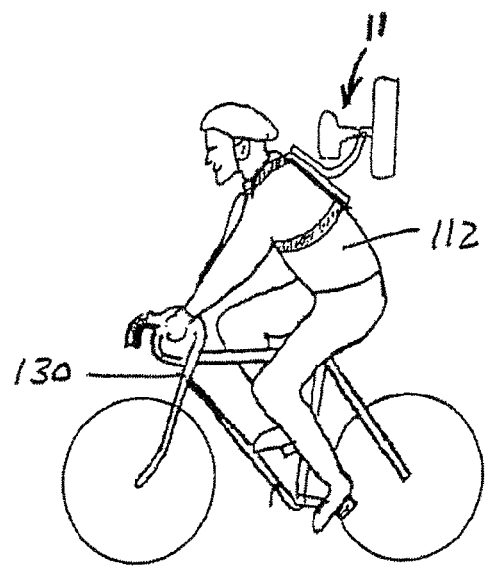
FIG. 5 is a side view of the Personal Propulsion Device shown on a user riding a bicycle in a crouch or racing position.

In FIG. 5, the user 112 is on bicycle 130 and the pivot block 31 is adjusted to nearly 45 degrees from the original position to apply direct thrust in the direction of travel details. The user 112 benefits from the crouched position by reducing his frontal area and therefore wind resistance. The personal propulsion device 11 benefits from less air disturbance entering the propeller 122. The thrust remains horizontal.

Figure 6:
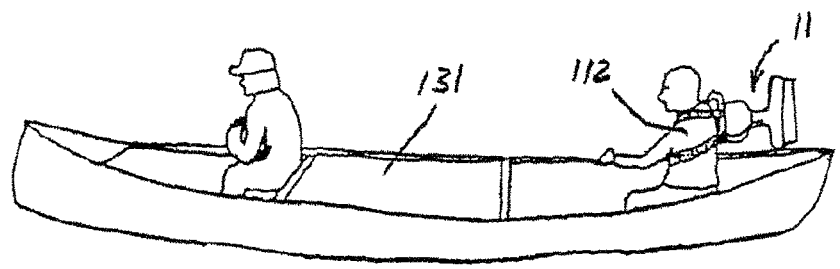
FIG. 6 is a side view of the Personal Propulsion Device shown on a user in a canoe.

In FIG. 6, the user 112 is shown in a canoe 131 and must first adjust the propulsion device 11 to the high back position as the surrounding gun whales are at his waist level and would interfere if the device 11 were fitted any lower. The bumper 129 acts as a flotation device, in the event the user enters the water displacing sufficient water to be over all buoyant.

Figure 7:
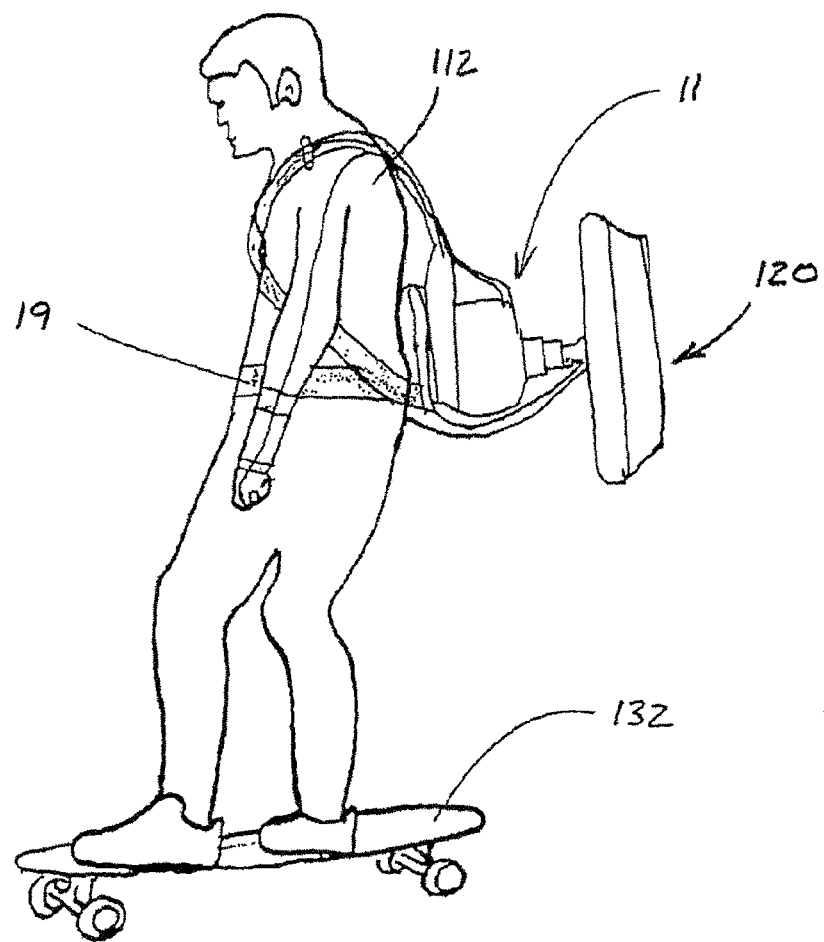
FIG. 7 is a side view of the Personal Propulsion Device shown on a user riding a skateboard.

The user 112 benefits from the low back position on a skateboard 132, shown in FIG. 7, as the center of thrust is closer to the wheel resistance of the skateboard 132. The propulsion device 11 is rotated to an oblique angle to the user 112 but thrust is retained inline with the direction of travel by the waist belt 19. The user 112 benefits from the throttle control glove 23 in that his hands are both free to use in any position to enhance balance and therefore safety. In the event of a fall, the user 112 can use both hands to break the fall instantly and without having first to release a grip on any sort of control bar.

Figure 8:
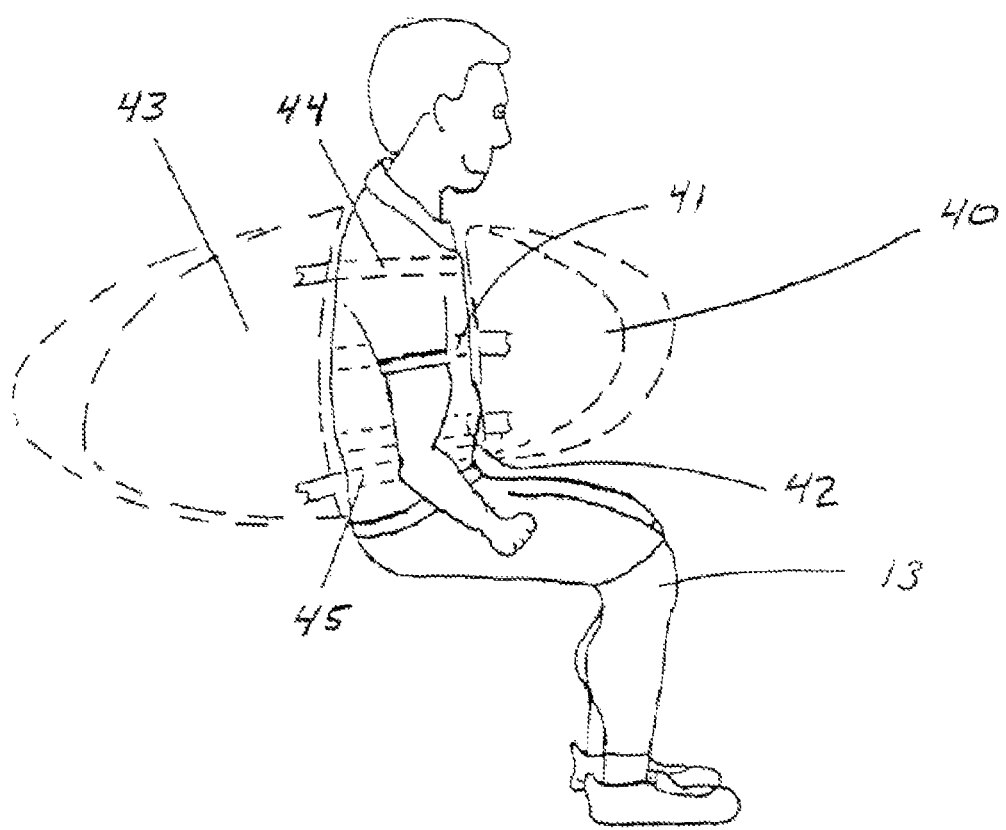
FIG. 8 is a side view of a user with an airfoil shaping safety bag.

FIG. 8 shows the side view of user 112 with the front inflatable airbag 40 that protects the user 112 from frontal impact and reduces wind resistance. The personal propulsion device 11 benefits from the aero shaping of the front airbag 40 as the air flow is separated around the user 112 more smoothly and returns to the propulsion device 11 with less disturbance than without the aero shaping airbag 40. The user 112 attaches the adjustable airbag retention straps 41 and 42 around his torso and tightens them firmly. The front airbag 40 may be used in co-operation with the rear air bag 43 by attaching the retention straps 44 and 45 as with the front airbag 40.

Using the front and rear airbags 40 and 43 simultaneously reduces the wind resistance so significantly and with very little weight increase that bicyclists, downhill skiers, hang gliders, etc. will establish economy endurance and speed records with the improved aerodynamics created with the airbags 40/43. The airbags 40/43 may be attached outside of the user's clothing or may utilize specially designed garments to help retain airbags 40/43 in position and further smooth airbag to users' body transition areas for smoother airflow. In any mode, the airbags should be of attractive high visibility colors for safety of user 112 and others. Many shapes of the airbags 40/43 will be created for various speeds and uses. In the present embodiment a stretchable material is reinforced to allow variable geometry aero shapes. As the airbags 40 and 43 are inflated with greater pressures they elongate, as shown in FIG. 8, for even less wind resistance. By complete deflating the airbags they can be stored away in a small space.

Figure 9:
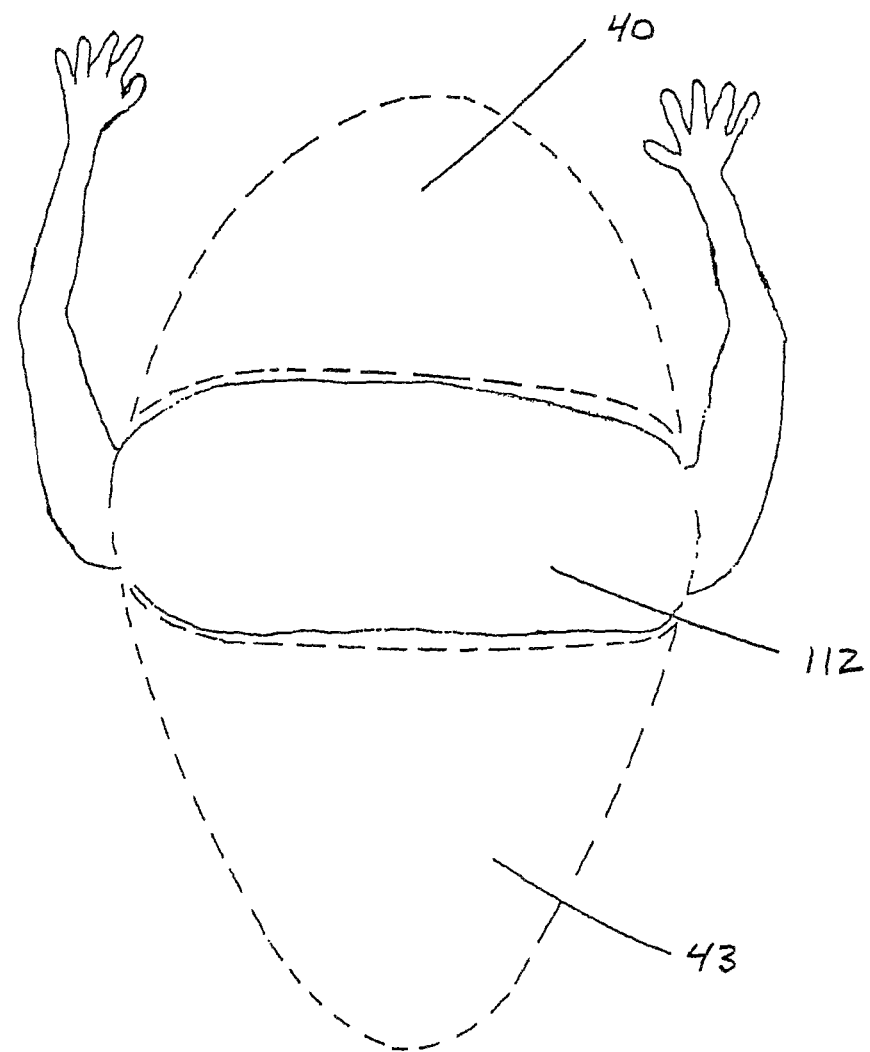
FIG. 9 is a top view of a human torso with an airfoil shaping safety bag.

FIG. 9 is a top view of a user 112 showing inflatable aero shaping front airbag 40 and co-operating rear airbag 43. When front airbag 40 is used without a personal propulsion device 11 the greatly improved aerodynamic shape is completed with the rear airbag 43.

Figure 10:
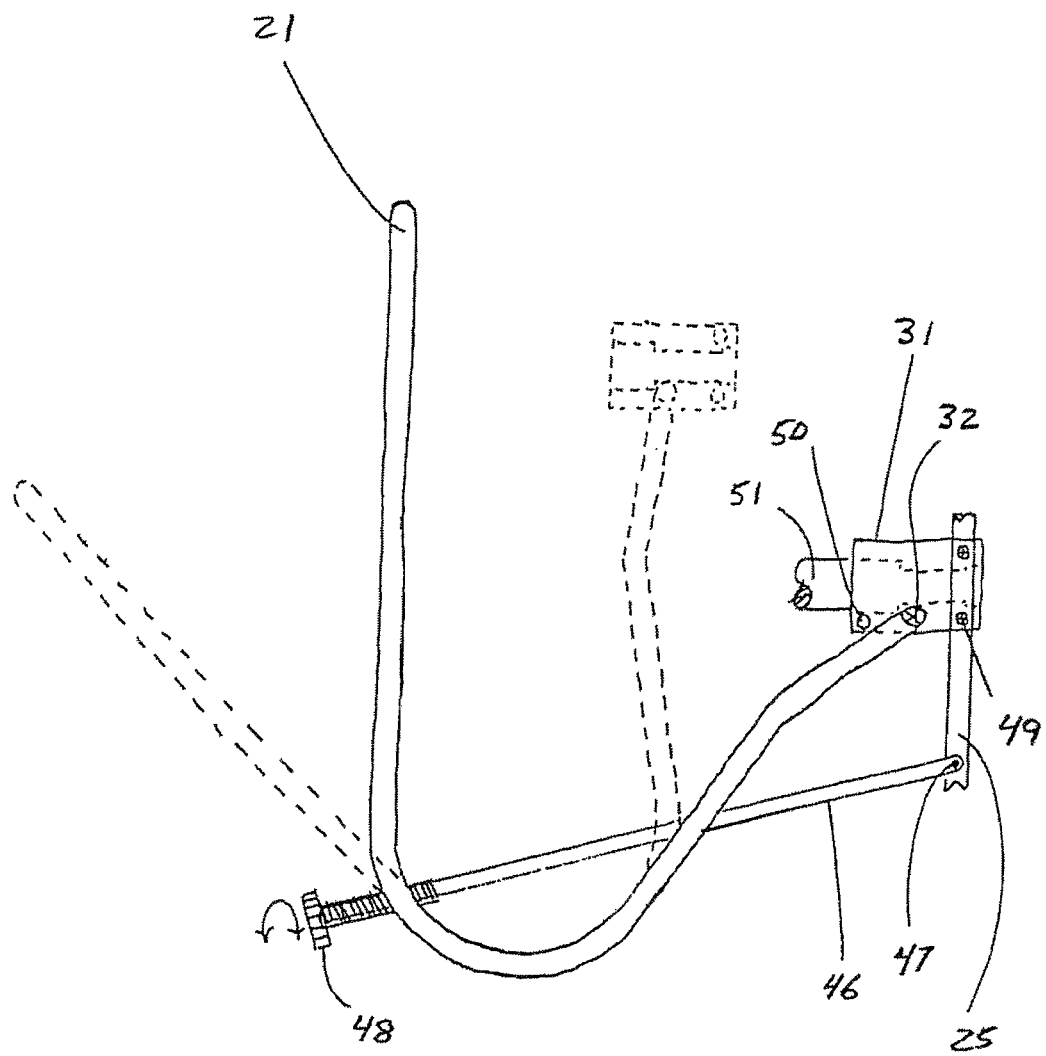
FIG. 10 is a side view of the frame of the Personal Propulsion Device of FIG. 1.

FIG. 10 is a side view of the lightweight aluminum frame 21 attached to the pivot block 31 with pivot bolt 32. The frame 21 can be rotated forward to accommodate the user 112 lowering the profile of his or her body by crouching, and the pivot block 31 can be pivoted by loosening pivot bolt 32 and retightening the bolt in pre-set position to produce horizontal thrust in a new frame position, shown as dashed lines in FIG. 10. In another embodiment, a link rod 46 is threaded at the forward end and is attached to shroud support strut 25 and allowed to pivot by link rod bolt 47. The link rod 46 is threaded through a female thread affixed to frame 21 and when the hand wheel 48 is rotated the pivot block 31 is pivoted while the personal propulsion device 11 is in user position. In the second embodiment, the pivot block bolt 32 is set with a castle nut and cotter pin to allow pivoting at will. Bolt 49 then clamps the propeller's thrust bearing and bolt 50 secures the propeller shaft housing tube 51.

The personal propulsion device 11 of the present invention may include any pivot block actuator for speed, safety, and convenience of pivoting said pivot block including but not limited to hydraulic, pneumatic, electrical solenoid, mechanical or other wireless remote controls and should be considered part of this invention.

Figure 11:
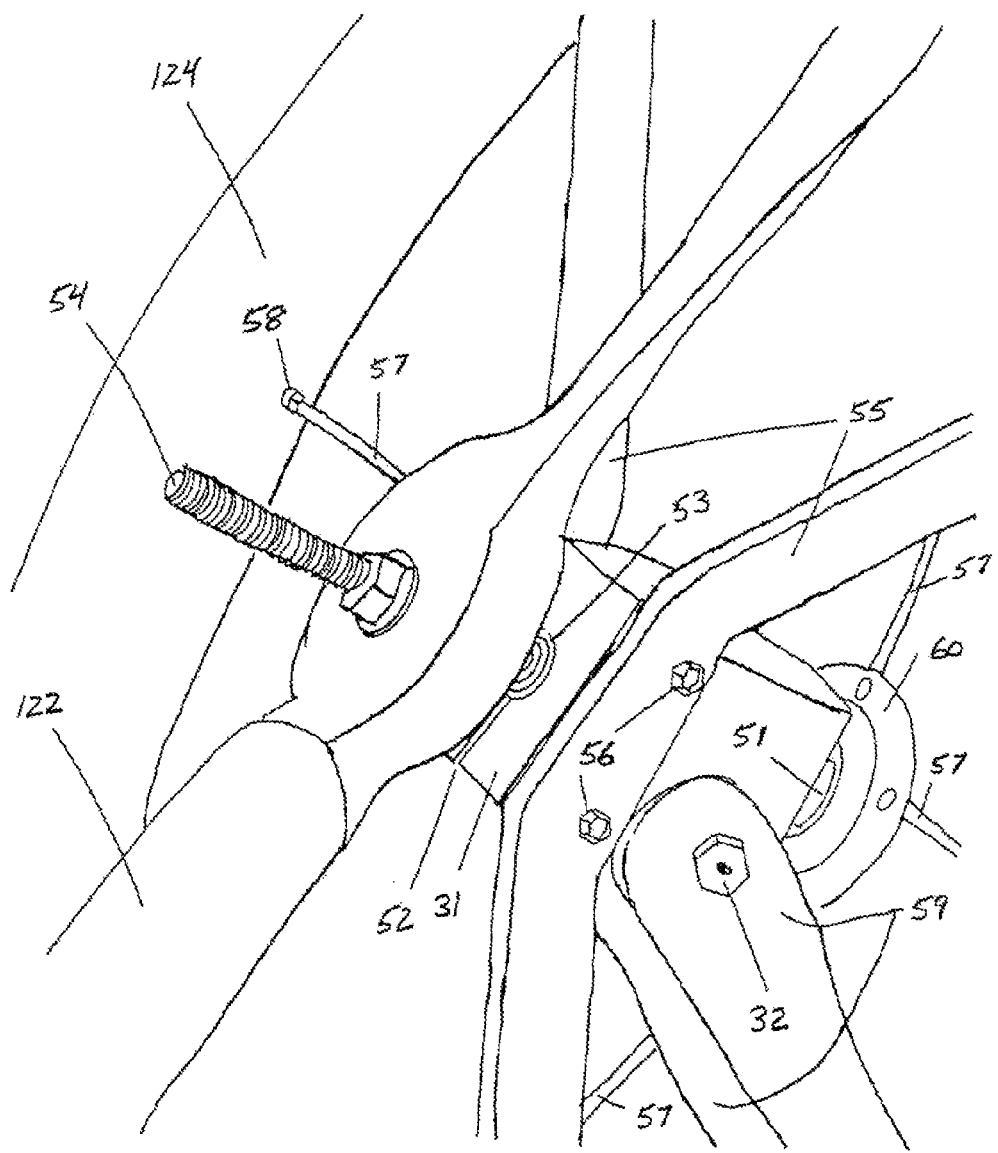
FIG. 11 is a perspective view of the rear end of the Personal Propulsion Device.

FIG. 11 is a perspective drawing viewed from the right rear of the personal propulsion device 11 and details the pivot block 31 and its various functions. When the pivot block bolt 32 is tightened it compresses slot 52 to secure the propeller shaft thrust bearing 53. The propeller 122 is attached to propeller drive shaft 54 and the shaft 54 passes through the bearing 53 to the motor 29, not shown. Propeller shroud 124 is attached to pivot block 31 by support struts 55 with bolts 56. The propeller shroud 124 can be adjusted to a round shape and the clearance for the propeller 122 can be set by the support spokes 57 by turning spoke nuts 58. Pivot block 31 is attached to frame ends 59 by the pivot block bolt 32. The spoke hub 60 is held in centered position by the propeller drive shaft housing tube 51 and the tube secured when bolt 32 is tightened, this clamping force also secures the motor 29, not shown, as the motor clamps to the propeller shaft housing tube 51.

The pivot block 31 allows the interchangeability of various motor sizes, powers and types, i.e. 4 stroke or 2 stroke, smaller power and lighter or larger horsepower and heavier etc. in the same string trimmer configuration. The pivot block 31 also allows quick interchangeability of the propeller shaft thrust bearing 53 in the event of bearing failure or shaft diameter variations when the motor 29 is changed. The pivot block 31 also allows interchangeability of modular shroud/strut/bumper combinations.

This modular interchangeable feature is highly desirable because people come in all sizes. For instance, a 110 lb female may enjoy a 16" diameter propeller and 1 hp engine with 10 lbs of thrust and an overall weight of 10 lbs, whereas a 250 lb man may require an 18" propeller and bumper combination and a 2.2 hp motor with 20 lbs of thrust and 17 lbs overall weight. The one pivot block 31 can be utilized to interchange frame sizes with the removal of only one pivot block bolt 32. This pivot block/motor mount/bearing mount/frame mount/strut mount is a single light weight component that attaches all modular components together. This facilitates a wide variety of option combinations for user comfort, convenience and safety.

Thus the reader will see that the personal propulsion device 11 of this invention is lightweight, quiet, economical, easy to operate, hands and arms are free and unencumbered during operation, and can be made to fit users from children to large adults. The device will save fuel and reduce emissions while providing transportation, fun and allowing users to benefit from a wide variety of HPVs.

Figure 12:
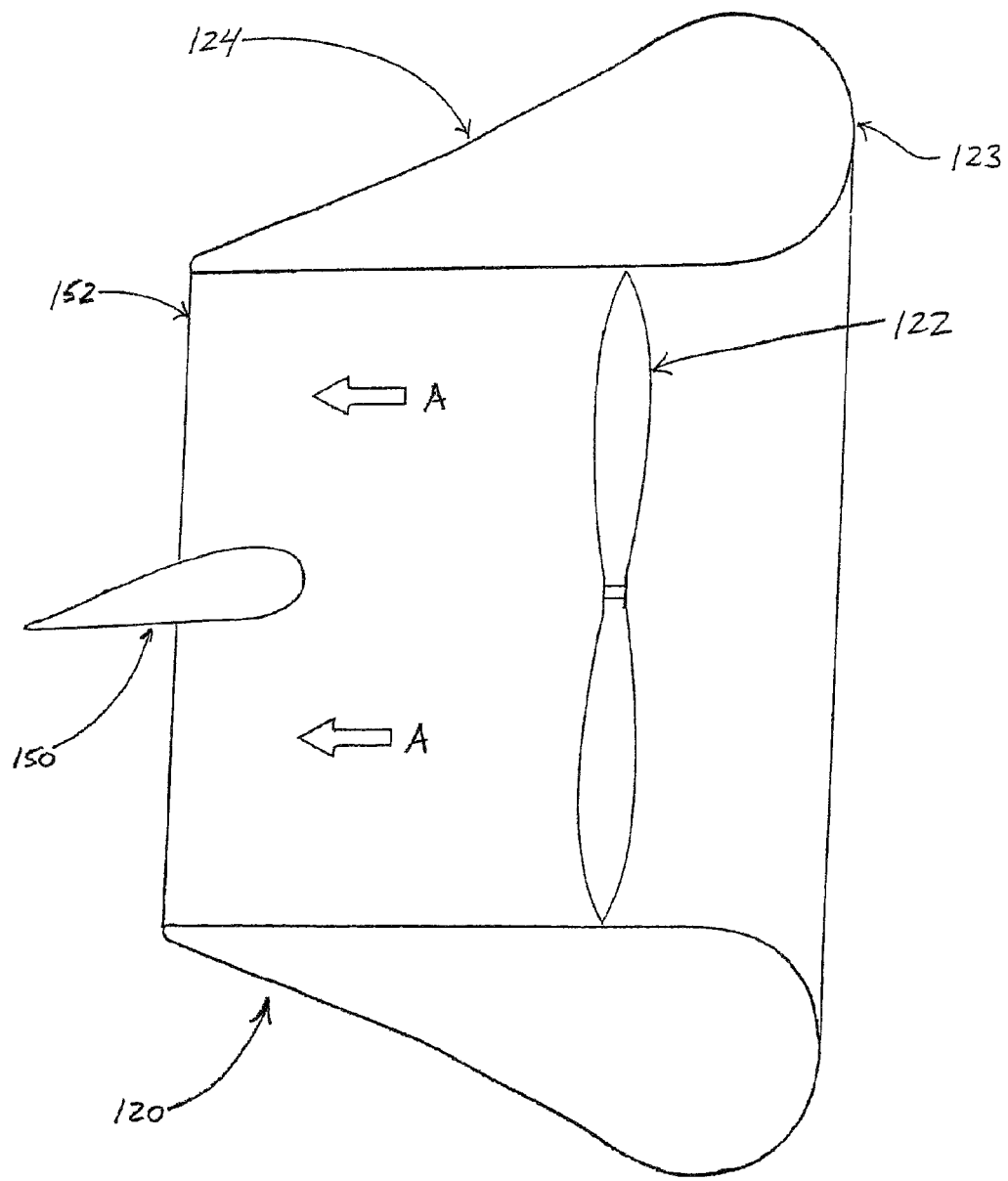
FIG. 12 is a cross-sectional side view of an alternative embodiment of the shrouded propeller assembly of the present invention shown with an airfoil utilized therewith.

An additional improvement to the personal propulsion device 11 of the present invention is shown in FIG. 12. As shown therein, one or more airfoils 150 are disposed in a generally horizontal configuration within the shroud 124 of the shrouded propeller assembly 120. In a preferred embodiment, airfoil 150 is attached to the interior surface 152 of shroud 124 utilizing a commonly available adhesive, which is selected based on its ability to secure airfoil 150 to the interior surface 152, or various other appropriate attachment mechanisms. Preferably, the airfoil 150 is of a standard National Advisory Committee for Aeronautics ("NACA") shape to yield a lift to drag ratio of 12:1 or better at an angle of attach of approximately four degrees. The area of airfoil 150 must vary with the weight and size of the shroud propeller assembly 120 and it should lift the weight to substantially neutralize it at maximum throttle so as to provide greatly increased comfort to the user with only eight ounces, on average, of thrust lost to drag out of the approximately fifteen pounds of average thrust produced by personal propulsion device 11. The preferred embodiment, shown in FIG. 12 with the airflow shown by the arrows A, utilizes a single airfoil 150 in a fixed position and the trailing edge thereof will be utilized to reinforce a rear wire guard, not shown. A plurality of airfoils 150 may be utilized to further reinforce the rear wire guard and they can be easily linked to vary the angle of attack to provide more lift. On long trips, where endurance is a major concern, the increased lift benefits of airfoil 150, which are desirable, warrant the loss of thrust due to the additional drag. A shrouded propeller has never been supported directly on the back of the user and, as a result, the need for this improvement has only become apparent after many hours of using such a device and the moderate back and neck discomfort that resulted from such use.

The further aft the airfoil 150 is positioned in the shrouded propeller assembly 120 the more lift leverage it applies at a given velocity, but the more static weight leverage it imparts to the user 112 when no thrust is being applied. This is of particular importance because when the airfoil 150 is positioned at the far aft position every gram of additional weight is effectively amplified to the user's back and shoulders.

Figure 13:
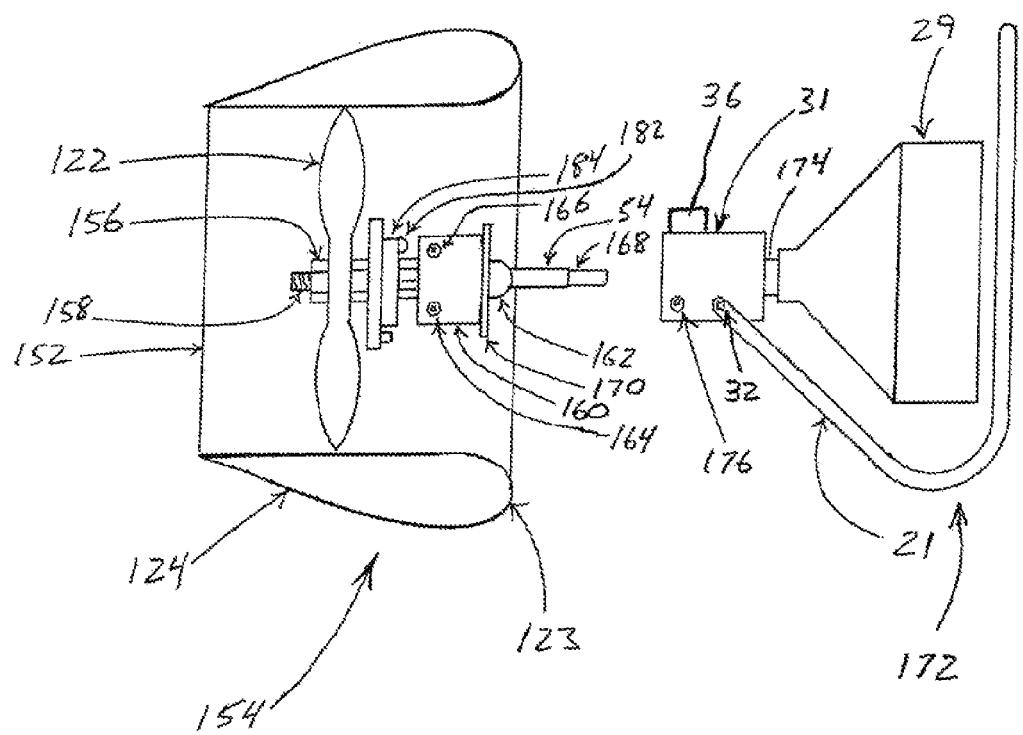
FIG. 13 is another alternative embodiment of the personal propulsion device of the present invention showing a cross-sectional side view of the propulsion means module and a side view of a propulsion means module utilized therewith to provide modular capability, shown in the detached position, and showing use of a compressor mounted on the pivot block.

Another alternative embodiment of the present invention is set forth in FIG. 13. This embodiment utilizes a propulsion means module 154 and a power means module 172 to provide functional modularity to the personal propulsion device 11 of the present invention. As shown in FIG. 13, the power means module 172 removably attaches to the propulsion means module 154, which comprises propeller 122 attached to propeller drive shaft 54 and held in place by the propeller nut 156 that is threadably received on the threaded portion 158 of drive shaft 54. The thrust bearing block 160, having an integral break-away fitting male part 162, of thrust bearing 53 (not shown in FIG. 13) is retained by tightening the bearing retaining/strut mount bolt 164. Strut mount bolt 166 is shown in FIG. 13, but the shroud support struts 55 are omitted for clarity. Shroud 124 is integral with shroud inlet lips 123 and shroud interior wall 152. Propeller drive shaft 54 is driven by a male square shaft drive fitting 168 that slips into a square female driver (not shown) when the propulsion means module 154 is connected to the pivot block 31 of the power means module 172. The shroud adjustment spokes 57, not shown in FIG. 13, attach to spoke hub 170.

The power means module 172 comprises pivot block 31, which is attached to frame 21 with pivot block bolt 32. Pivot block 31 clamps onto one end of motor mount tube 174 and the motor 29 clamps onto the other end of motor mount tube 174. Separation tension adjustment bolt 176 is adjusted to set the removal force required to slip break away fitting male part 162 out of the female part in pivot block 31. Although not shown in FIG. 13, the power means module 172 further comprises shoulder straps 17 and 18, comfort pad 22, starter means 16, waist belt 19 and control glove 23. The broad diversity of intended uses of personal propulsion device 11 is beneficially achieved by the interchangeability feature of the propulsion means module 154 and power means module 172. In addition, repairing, servicing and upgrading of the personal propulsion device 11 will generally only require the propulsion means module 154 to be shipped, which typically requires a round trip.

When separation adjustment bolt 176 is loosened, the propulsion means module 154 will break away by the square male shaft drive fitting 168 slipping out of the female square driver (not shown) of pivot block 31. This feature can also be important during use of personal propulsion device 11. For instance, during skateboarding activities, such as skateboard exhibitions where giant aerobatics are performed, it is possible, if not somewhat expected, that user 112 will fall. A light tension setting of separation tension adjustment bolt 172 allows the modules to relatively easily separate, thereby imparting less impact to the user 112, propulsion means module 154 and shrouded propeller assembly 120 during the break-away.

As shown in FIG. 13, motor 29 is retained in its desired position with pivot block bolt 32 during interchanging of propulsion means module 154. If the motor 29 requires removal or adjustment pivotally, the pivot block bolt 32 is loosened, allowing motor 20 to be removed by withdrawing motor mount tube 174 or allowing the angle of thrust relative to the user's body to be adjusted, and then pivot block bolt 32 is re-tightened.

The propulsion means module 154 further comprises an optional magnet 178 imbedded in or attached to magnet plate 180. A plurality of powerful rare earth magnets may be imbedded in or attached to magnet plate 180 and an electrical coil wound around an armature (not shown) or a plurality of coils may be mounted to the pivot block 31 in a position that when the propulsion means module 154 is connected to the power means module 172, the proximity of the magnets 178 to the electrical coils creates electricity as the magnet plate 180 rotates with propeller 122. This electrical configuration is accomplished with no belts, gears or secondary drive apparatuses and can charge an on board battery for continued LED illumination even when the propeller 122 is not turning. The magnet plate 180 diameter can be made as large as needed and more magnets 178 attached to provide more wattage, with the attendant power diversion from the propeller 122. Nighttime safety lighting is so important that the power diversion will be accepted my most users. As an option, the personal propulsion device 11 can also include an electric start feature for motor 29.

As shown in FIG. 13, the personal propulsion device 11 of the present invention can include a cam mechanism, such as a cam lobe 182 that is attached to cam lobe plate 184, that is engaged with and driven by propeller shaft 54 to power a small, lightweight diaphragm-type compressor 36, which is shown mounted to pivot block 31, that is operatively connected to the cam mechanism such that when propeller 122 is turning air is compressed. The compressed air can be utilized to inflate tires, inflatable shroud inlet lips 123, inflatable shrouds 124 and/or aero shaping bags and the like. A small lightweight pressure tank may be pressurized such that even when the propeller 122 is not turning so air pressure can still be available. Small diameter quick couplers may connect the tank to the compressor 36 only when needed.

Figure 14:
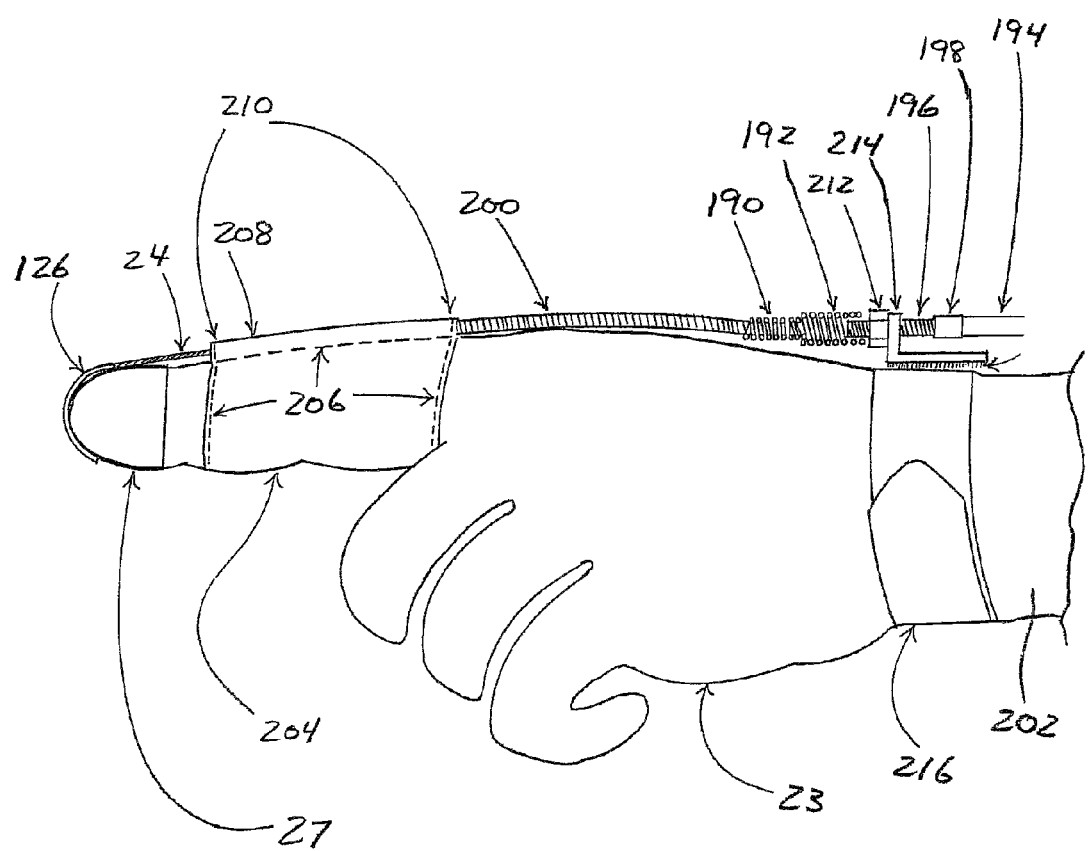
FIG. 14 is a side view of an alternative embodiment of the control glove, shown on the hand of a user, utilized with the personal propulsion device of the present invention.

An alternative embodiment of the control glove 23 utilized with the personal propulsion device 11 of the present invention is shown in FIG. 14. The improved control glove 23 facilitates setting cruise speed, engine idle speed and/or throttle response sensitivity. The improvement is particularly desirable for use when personal propulsion device 11 is utilized with HPVs that require or are benefitted by the use of a full, strong four finger and thumb grip, such as when holding a canoe paddle or a ski pole. During a full hand grip, the index finger is flexed around a canoe paddle or ski pole, as examples, which causes the throttle to remain at full power. The improved control glove 23 resolves this issue.

The improved control clove 23 has an intermediate spring 190 that is threaded onto base spring 192 such that simply turning the base spring 192 applies tension or releases tension to the throttle actuating cable 24 by applying pressure to the throttle cable housing 194 through the base spring 192, which is threaded onto the threaded portion 196 of a cable housing termination fitting 198. The long, finely wound and very flexible spring 200 is threaded into intermediate spring 190, which is cooperatively sized for a tight interference fit. The flexible spring 200 allows intermediate spring 190 to rotate freely several revolutions in either direction to increase tension and, therefore, sensitivity or to decrease tension/sensitivity. This "on the fly" adjustment feature allows the user 112 to increase the idle speed when the motor is cold or at high altitudes. The user 112 may also adjust the cruise speed by turning intermediate spring 190 to the desired power setting in conjunction with a given steady grip position of the hand. By rotating intermediate spring 190 in the relaxing direction, the user 112 can flex all four fingers in a full grasp with the thumb wrapped inward and not affect the throttle until the wrist 202 is flexed slightly, which increases tension on the throttle cable 24 and increases the throttle and thrust. The widely versatile control system described above is a significant improvement to the safety of user 112 by allowing him or her to utilize both hands with a full strong grip on the HPV or other apparatus and still remain in full control of the personal propulsion device 11.

In a preferred embodiment of control glove 23, a sleeve 204 made out of a stretchable material is stitched onto control glove 23 at the seams 206 and to form a small tube 208, shown at the top of sleeve 204. Alternatively sleeve 204 can be attached to control glove 23 utilizing other mechanisms or be formed integral with control glove 23. In the preferred embodiment, one end of flexible spring 200 is inserted into the fabric forming tube 208 at the top of sleeve 204 and sewn into place at one or more stitch points 210 to anchor one end of flexible spring 200 to the control glove 23 and yet allow unrestricted flexing of the index finger 27.

The three spring assembly, generally comprising base spring 192, intermediate adjustment spring 190 and flexible spring 200, protects the small, relatively fragile strands of the ultralight cable 24 utilized in the preferred embodiment of the present invention. This protection from physical damage to the cable 24 is further improved by use of a tension type spring so the coils of the spring are substantially closed to keep out dirt and other abrasives. Where the knuckle flexing of index finger 27 opens the coils of flexible spring 200 the widest, use of the fabric tube 208 covers and protects cable 24 from such abrasives.

An adjustment to cable housing 198 can be set and locked with lock nut 212 to cable housing stop plate 214. A course adjustment can be made quickly by ripping cable housing stop plate 214 from wristband strap 216, disposed around the user's wrist 202, by releasing the hook and loop fastener 218 and repositioning the stop plate 214 relative to the strap 216.

As will be readily understood by those skilled in the art, the present control glove 23 is versatile, safe and allows the opposed thumb to be used in conjunction with all four fingers in a full, strong and safe grip. The prior art control gloves do not allow this level of gripping and do not provide for the various adjustments thereto that are available in the present control glove 23. In addition, the present control glove 23 allows a wider variety of user sizes and intended uses with the same control glove 23. Further, other controls can be incorporated into control glove 23, such as wrist flexing to the right to steer a HPV or other apparatus to the right and wrist flexing to the left to steer to the left. The adjustable sensitivity control glove 23 allows steering and setting center for straight travel with similar "on-the-fly" adjustments.

The adjustable sensitivity control glove 23 described above can be utilized with a propulsion device, such as the personal propulsion device 11 of the present invention, or other propulsion devices. The control glove 23 can be utilized with the cable 24 connecting to the throttle or with a variety of wireless mechanisms. In general, the adjustable sensitivity control glove will make many activities safer and more comfortable.

Figure 15:
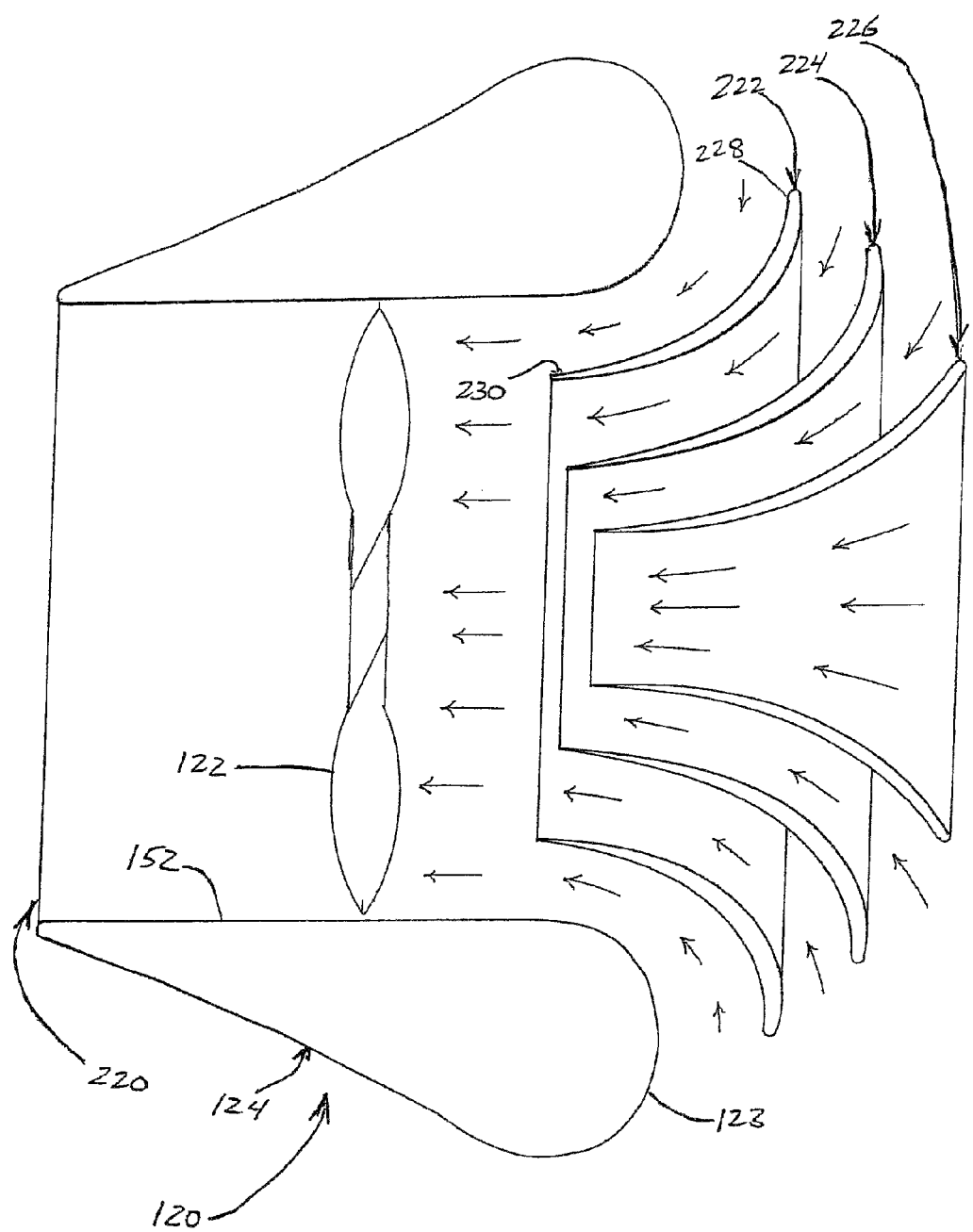
FIG. 15 is a cross-sectional side view of an alternative embodiment of the shrouded propeller assembly of the present invention shown with a plurality of air horns.

A cross-sectional view of an alternative embodiment of the shrouded propellor assembly 120 for use with the personal propulsion device 11 of the present invention is shown in FIG. 15. As shown, the shrouded propellor assembly 120 comprises a shroud 124 having a shroud interior wall 152, air exit end 220, propellor 122 and air inlet lip 123. The shrouded propellor assembly 120 is more efficient than an open propellor assembly of the same size due to the inlet lip 123 smoothing the air flow, shown in arrows on FIG. 15, to conform it to the interior wall 152 of the shroud 124 and the close tolerance of the propellor 122 to the shroud interior wall 152. This close tolerance limits propellor tip vortices and turbulence as air continuously spills from the high pressure side to the low pressure side of any propellor tip or wing tip.

With the air flow generally parallel to the interior wall 152 the highest speed portion of the propellor 122, the propellor tip, propels clean air flow with little loss due to turbulence of the tip. The great inrush of air necessary for propulsive efficiency can draw foreign objects into the shroud 124 and propellor 122, which can cause damage to the device 11 or injury to user 112 or other persons as the propulsion unit is in close proximity to the user 112 and any bystanders. Another issue with regard to shroud 124 is that noise awareness has increased. In fact, noise is treated as an emission by some regulatory agencies. The addition of the shroud 124 has been documented to actually increase the noise level and it is believed that this is due to the interference of the propellor 122 and/or the shroud support struts 25. Traditional wire mesh safety guards disturb the incoming air and reduce thrust and do little or nothing to reduce the noise level. As set forth below, the present invention improves the shrouded propellor assembly 120 in three ways.

As shown in FIG. 15, the improved shrouded propellor assembly 120 further comprises multiple inlet air horns, such as first air horn 222, second air horn 224 and third air horn 226, to help conform the air to its most efficient flow pattern possible, as indicated by the air flow arrows shown in the figure. The air horns 222, 224 and 226 are preferably molded together with spacers or the like, not shown.

As set forth above, the personal propulsion device 11 of the present invention is worn on the back of the user 112. Unfortunately, this blocks the air flow that would otherwise inflow generally parallel to the shroud interior wall 152. In the present embodiment, the air flows around the user 112 and the multiple air horns 222, 224 and 226 direct the air so that it is parallel to the axis of propellor 122 and the shroud inlet wall 152 and generally parallel to the inlet lip 123 of shroud 124. The high speed air passing air horns 122, 124 and 126 exert aerodynamic forces as any curved wing in an air stream, namely there is higher pressure on the inside of the curve and lower pressure on the outside of the curve resulting in "forward lift" and adding to the thrust created by propellor 122. As shown in FIG. 15, the air horns 122, 124 and 126 are shaped like a curved wing in that their leading edges 228 are generally rounded and the trailing edges 230 are generally pointed. This configuration further helps the air flow to become generally laminar and increases the "forward lift". In one configuration, the air horns 222, 224 and 226 are made out of an acoustically deadening material or sound absorbing material to absorb noise and/or reflect noise away from the ears of the user 112. An additional benefit of air horns 222, 224 and 226, provided by them being generally in close proximity to each other, is that they prevent sizable foreign objects from entering the area of propellor 122 and no arm or hand could accidently enter this area during a fall or an impact. For smaller users 112, having smaller hands, the air horns 222, 224 and 226 are closer together. As will be understood by those skilled in the art, the use of air horns 222, 224 and/or 226 with the shrouded propellor assembly 120 adds propulsion efficiency, reduces noise to the user 112 and improves safety for the user and any bystanders. Another potential benefit of the closely spaced air horns 222, 224 and/or 226 is that this configuration could eliminate the requirement for a wire mesh guard, a feature that is believed to be important for use with a wireless remote control glove 23 due to the wire mesh being a well known source of RF interference.

Figure 16:
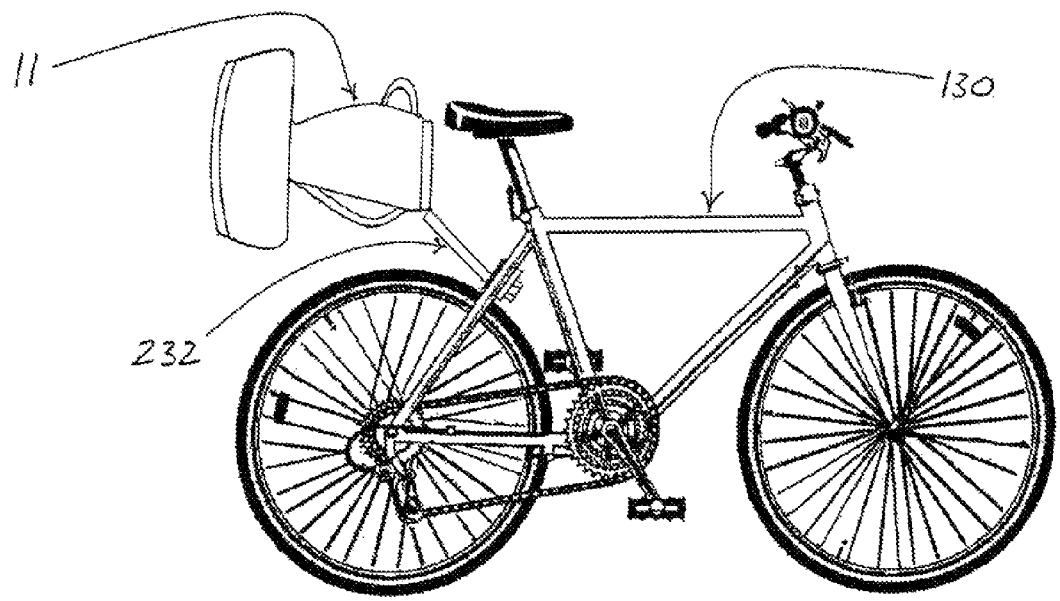
FIG. 16 is a side view of an alternative configuration of the personal propulsion device of the present invention shown mounted to a bicycle with a mounting mechanism.
Figure 17:
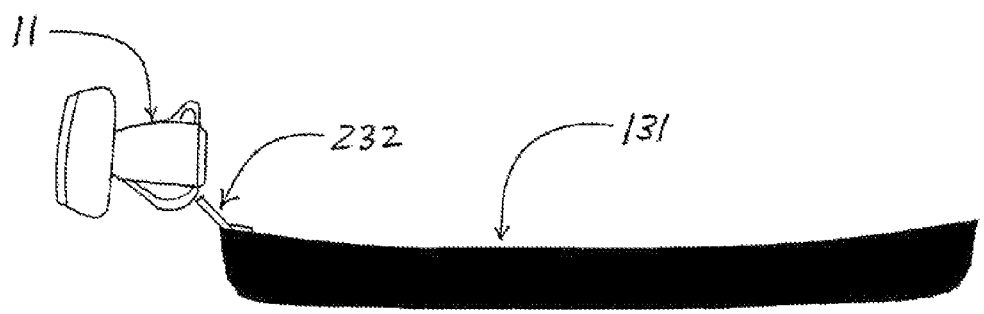
FIG. 17 is a side view of an alternative configuration of the personal propulsion device of the present invention shown mounted to a canoe with a mounting mechanism.

An alternative embodiment of the personal propulsion device 11 of the present invention is shown in FIGS. 16 and 17 with a HPV. In FIG. 16, a typical bicycle 130 is fitted with a standardized mounting mechanism, shown as 232, that is configured to cooperatively engage an adapter, fitting or like device, not shown, on the personal propulsion device 11 so that the device 11 can be securely mounted to bicycle 130, via mounting mechanism 232, as shown in the figure. This option allows the user to ride the bicycle 130 without the weight of the personal propulsion device 11 on their back. In FIG. 17, the canoe 131 is fitted with the mounting mechanism 232 and the personal propulsion device 11 is mounted thereto to provide power to the canoe without the user 112 having the personal propulsion device 11 on their back. Preferably, mounting mechanism 232 when used with canoe 131 will be configured to position the personal propulsion device 11 lower toward the waterline to maintain the center of gravity as low as possible. In addition to being more comfortable for the user 112, this configuration is also likely to be safer in case of canoe 131 capsizing and allows the user 112 to more freely move about while paddling, fishing, trolling or other activities. In addition to bicycle 130 and canoe 131, the mounting mechanism 232 can be utilized with other HPVs. Because some governmental agencies may consider bicycle 130, canoe 131 or other HPV configured in this manner to be a motorized vehicle, the use of this embodiment may be restricted to "open" areas.

It is strongly preferred that the embodiments of FIGS. 16 and 17 be utilized in conjunction with the wireless remote control glove 23 because the motor 29 is disposed at a greater distance from the user 112 than when it is on the user's back. It is unsafe to attach a control glove 23 to any apparatus from which the user 112 may be separated from in a crash or fall, as the tensile strength of the average throttle cable 24 is between 100 and 200 lbs. The user 112 could be entangled in or be dragged by the cable 24, which could jerk the user's arm or hand hard enough to possibly cause serious injury. Preferably, the only time a throttle cable 24 attached to the user's hand and the apparatus can be deemed safe is when the apparatus is secured to the user 112 and cannot be dislodged by accident.

Figure 18:
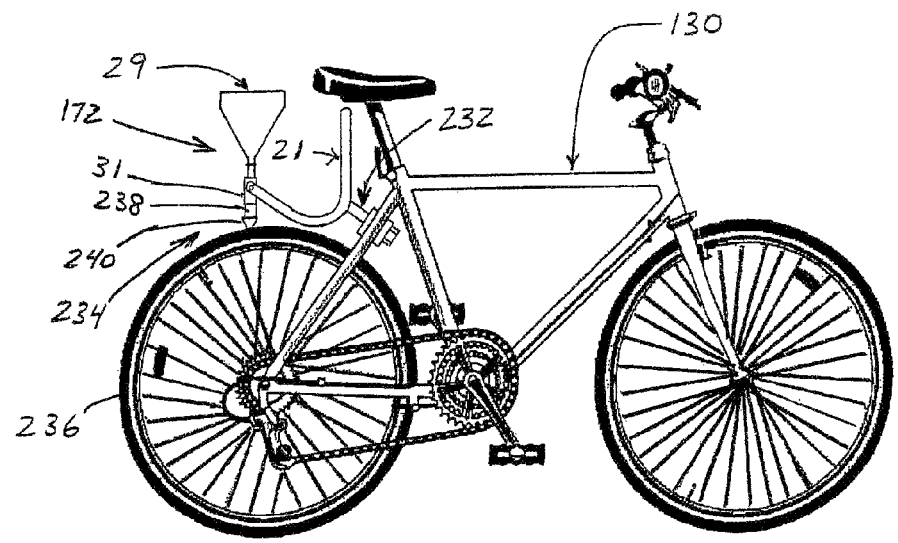
FIG. 18 is a side view of an alternative configuration of the present invention shown mounted to a bicycle and engaged with a tire in a direct drive position.
Figure 19:
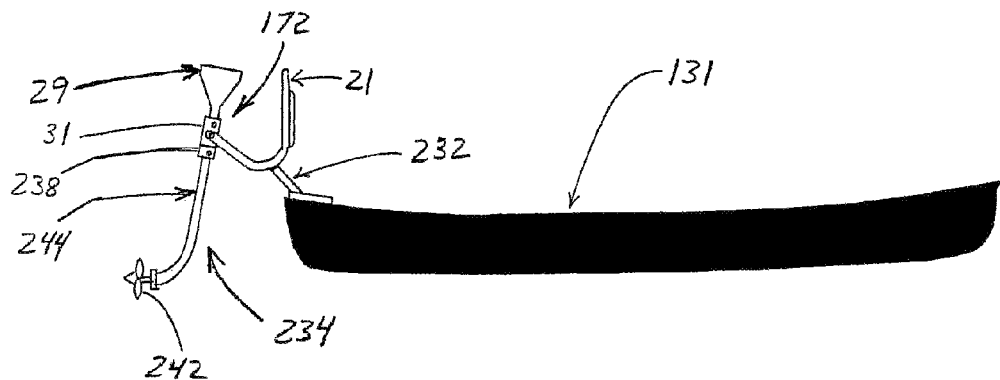
FIG. 19 is a side view of an alternative configuration of the present invention shown mounted to a canoe and configured to turn a propeller to propel the canoe.

FIGS. 18 and 19 show an alternative configuration of the present invention in use with a bicycle 130 (FIG. 18) and a canoe 131 (FIG. 19). As shown in the figures, bicycle 130 or canoe 131 is fitted with a standardized mounting mechanism 232 that is configured to attach to power means module 172, which operatively connects to a direct drive propulsion mechanism 234 that, in FIG. 18, engages a tire 236 of bicycle 130 to propel bicycle 130 over a surface such as a road or the like or, in FIG. 19, propels canoe 131 across the water. In a preferred embodiment, the mounting mechanism 232 attaches to frame 21 by an adapter, fitting or like device, not shown, on frame 21, which is connected to pivot block 31. Pivot block 31 is attached to motor 29. In this embodiment, the propulsion means module 154, described above in conjunction with FIG. 13, is removed from pivot block 31 so that the direct drive propulsion mechanism 234 may be attached thereto. In the embodiment of FIG. 18, direct drive propulsion mechanism 234 comprises a thrust bearing block 238 and direct drive cone 240, which is rotatably supported by a thrust bearing, not shown, and driven by a square end drive shaft, also not shown. In the embodiment of FIG. 19, the direct drive propulsion mechanism 234 comprises a marine-type propeller 242 at the end of drive shaft housing tube 244 enclosing a flexible drive shaft with a sealed propellor bearing (both not shown). As with the embodiment of FIG. 13, the direct drive module 234 inserts into the pivot block 31 of the power means module 172 and the separation tension adjustment bolt 176, not shown in FIGS. 18 and 19, is tightened firmly.

In the embodiment of FIG. 18, the friction drive cone 240 rides in firm contact with the tire 236 of bicycle 130 when pivot block 31 is rotated to bring motor 29 nearly vertical so as to dispose direct drive cone 240 against the tire 236. The direct drive cone 240 may be adjusted relative to the tire 236 by pivoting pivot block 31 and thereby adjusting the effective gear ratio. In the embodiment of FIG. 19, the pivot block 31 is rotated to place marine propellor 242 in the water at the desired depth. The embodiments of FIGS. 18 and 19 improve the comfort of user 112 by positioning the weight of the propulsion device to the frame of bicycle 130 or the canoe 131 and reduces the noise by eliminating the propellor 122. In the embodiment of FIG. 19, the user 112 has more freedom of movement to paddle, fish or engage in other activities that are commonly associated with use of a canoe 131 or other water craft.

The embodiments of FIGS. 18 and 19 are only recommended for use in conjunction with the wireless remote control glove 23 described above. As will be readily understood by those skilled in the art, the embodiments of FIGS. 18 and 19 allow the personal propulsion device 11 to be transformed by interchangeability to a quiet, fuel efficient direct drive system that can be easily pivoted to disengage the device to allow the user 112 to peddle or paddle freely if desired or out of fuel. It is believed that the embodiment of FIG. 18 can achieve fuel consumption levels of 150 mpg and a catalytic converter can be added to approach zero air pollution emissions. When not used to provide power to the HPV, such as bicycle 130 or canoe 131, the direct drive module can be pivoted out of the way and the HPV operated as normal with relatively little added weight (i.e., approximately 12 lbs.).

Many other variations are possible for the present invention. For example, a stretchable fabric can be affixed over the inlet end of the propeller shroud and stretched over the round bumper and attached at the back end of the propeller shroud to add color and smooth the airflow over the device. The pivot block 31 can be mounted rotatably about a vertical axis and both horizontal and vertical rotation of thrust may be controlled by D.C. step motors and remote control switches on the control glove 23. The glove 23 may be detached and retained with the user 112 after dismounting and leaving the device 11. This is a disabling feature of the propulsion unit 11 to discourage theft. Without possession of the glove 23 the thief could not start or operate the device 11.

Figure 20:
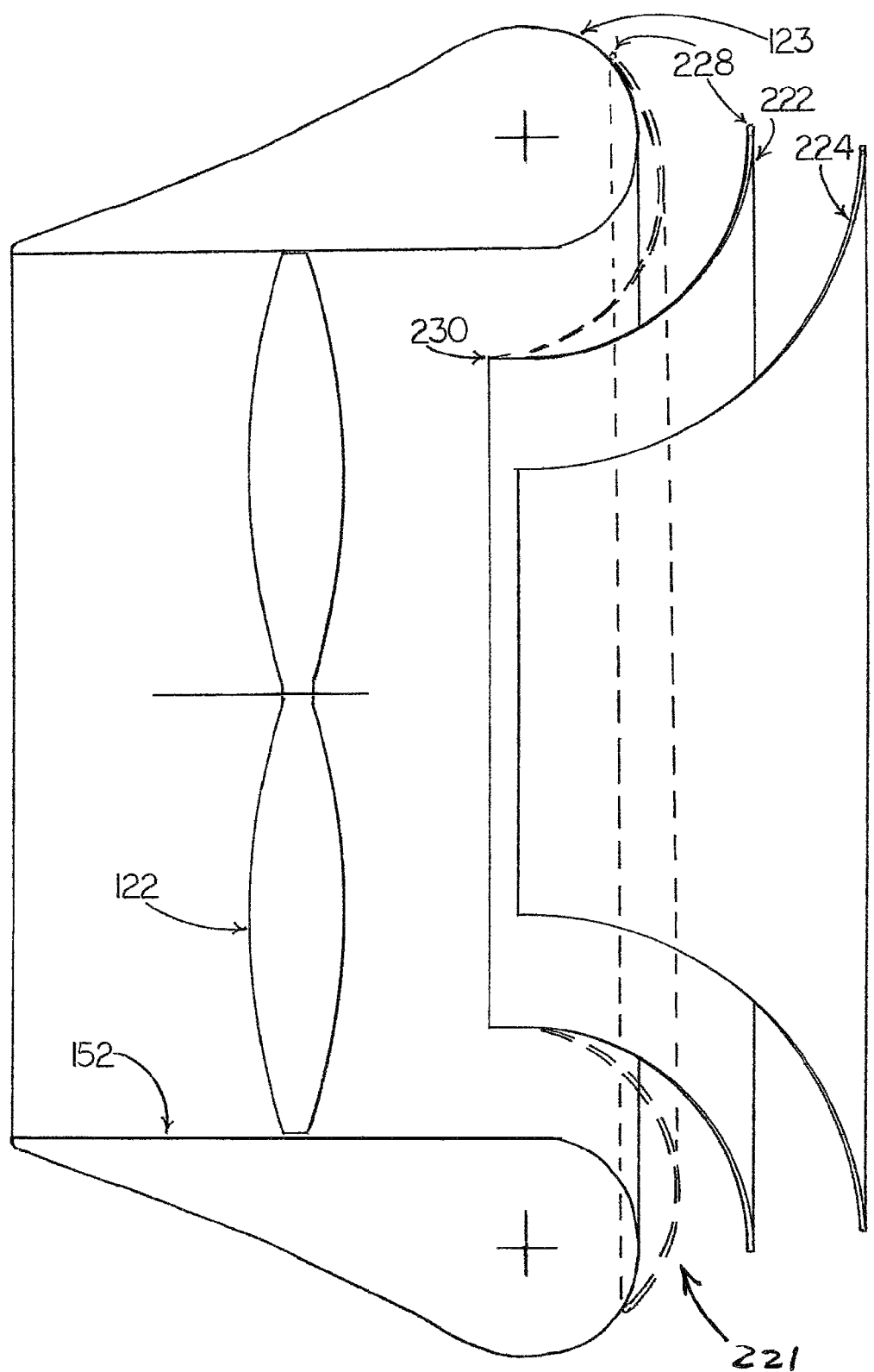
FIG. 20 is a side view of shrouded propeller assembly with warpable first air horn.
Figure 21:
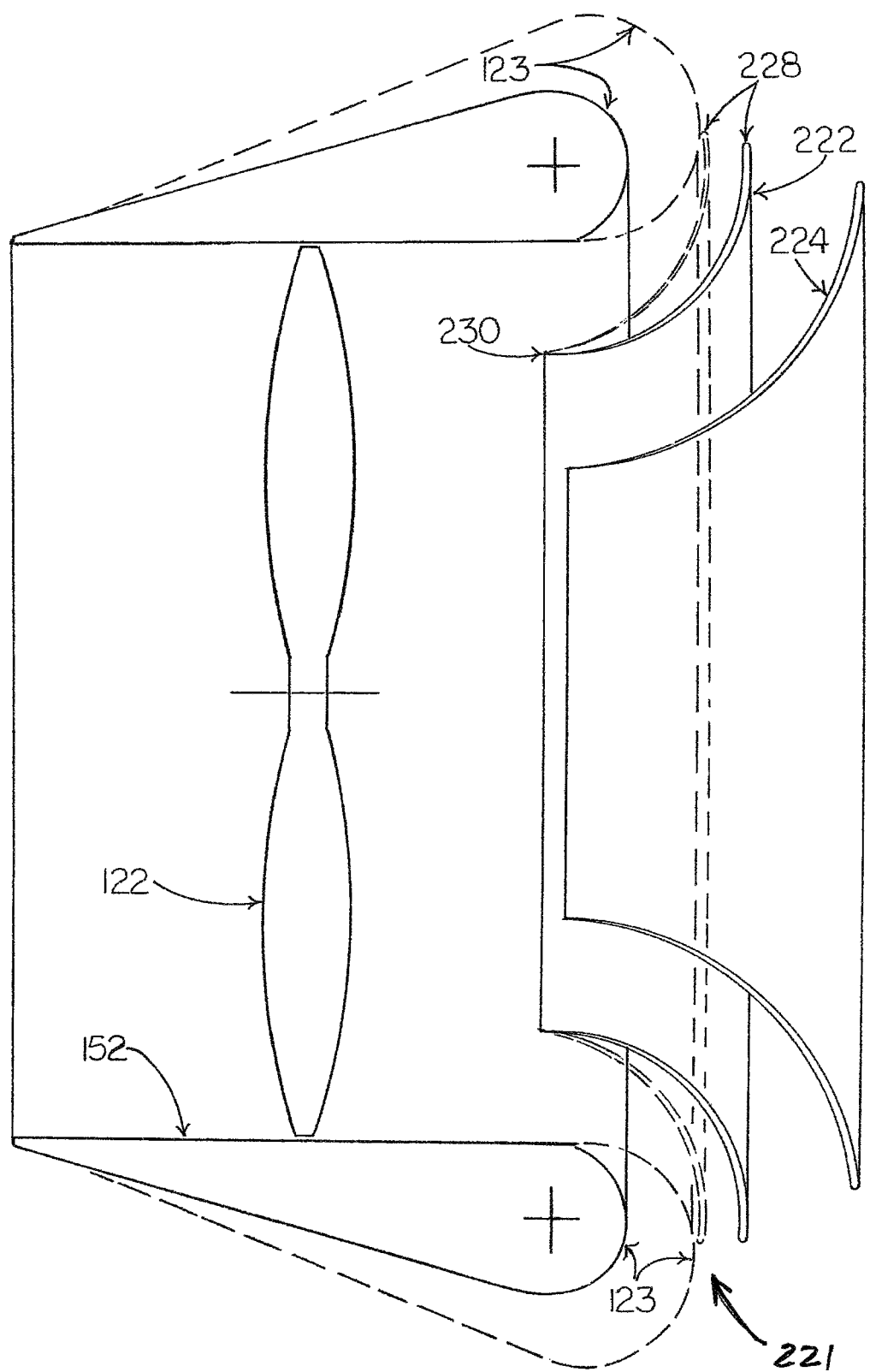
FIG. 21 is a side view of shrouded assembly with inflatable inlet lip and warpable first air horn in combination.
Figure 22:
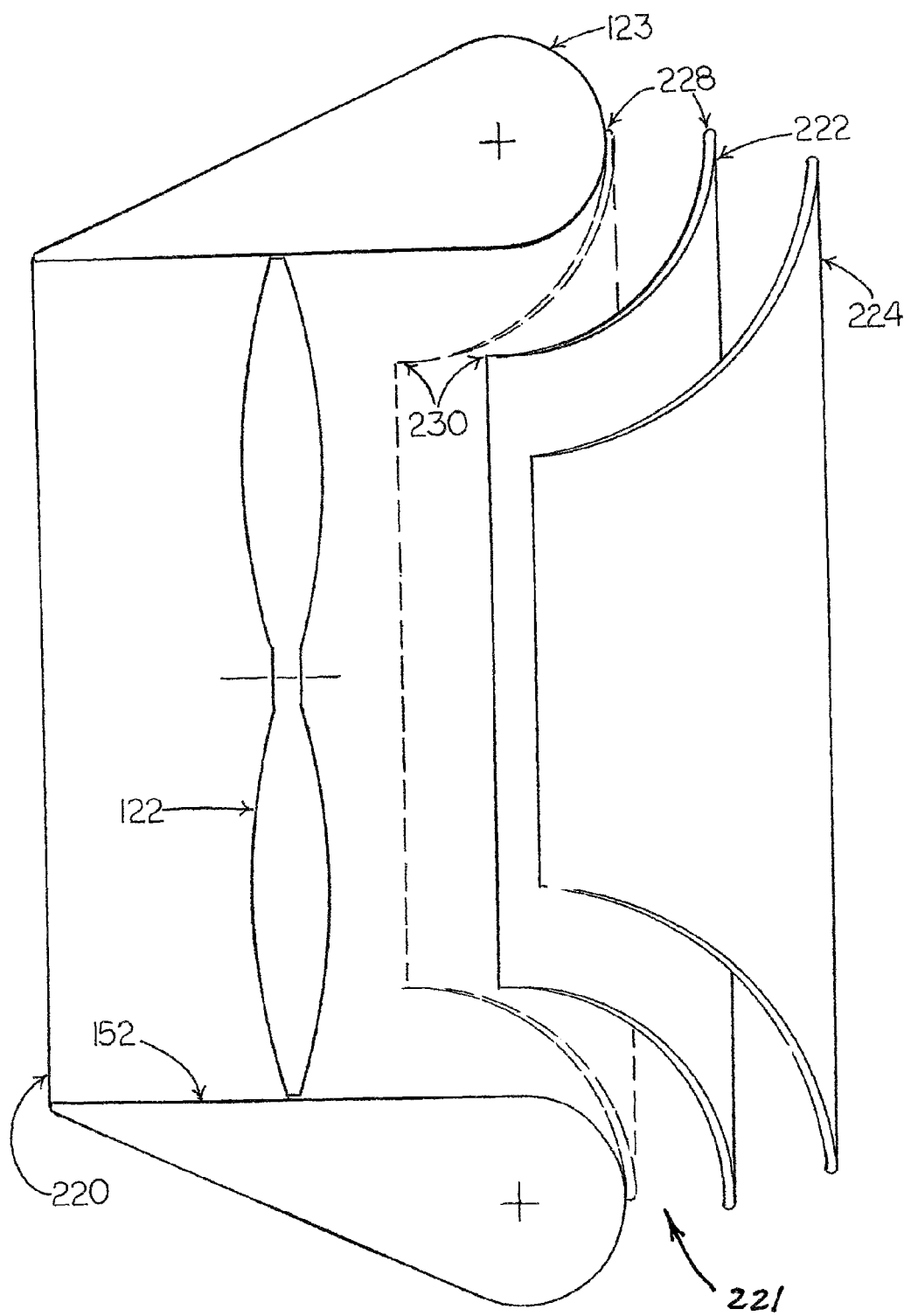
FIG. 22 is a side view of shrouded propeller assembly with slidable first air horn.

In an alternative embodiment of the present invention, the personal propulsion device 11 includes one or more gap control mechanisms to increase or decrease the air inlet gap 221, shown on FIGS. 20 through 22, between the shroud inlet lip 123 and the first inlet air horn 222. The gap control mechanisms are configured to reduce noise from the propeller 122 by decreasing the air inlet gap 221 and to increase propulsion by increasing the air inlet gap 221. Examples of such mechanisms are set forth below and shown in FIGS. 20 through 22.

As shown in FIG. 20 the first inlet air horn 222 is gradiently flexible and warpable to allow movement of the leading edge 228 toward the shroud inlet lip 123. A control means (not shown) adjusts the distance between leading edge 228 and shroud inlet lip 123 so as to increase or decrease the air inlet gap 221. As this distance decreases air resistance increases, thereby decreasing air flow to the propeller 122 between its trailing edge 230 and shroud interior wall 152. Starving the propeller tip region of air flow in this manner reduces the noise generated by the highest speed, outer region of the propeller. The loss of thrust is somewhat offset by the increase in the effective radius of the inlet lip 123. It has been long understood in the art that any increase in inlet lip radius increases forward lift of a shrouded propeller and therefore overall thrust. Additionally, as leading edge 228 is adjusted toward the shroud inlet lip 123 the gap between the first inlet air horn 222 and second inlet air horn 224 increases, thereby improving efficiency of propeller 122 at its mid regions. Unloading of the propeller tips will increase the RPM, which will also offset the anticipated thrust loss. When conditions allow, the first inlet air horn 222 is restored to its original position which is factory set for maximum propulsive efficiency.

FIG. 21 shows the use of an inflatable shroud inlet lip 123 that is used in combination with a gradiently flexible/warpable first inlet air horn 222. An increase in pressure increases the actual diameter of the shroud inlet lip 123, thereby reducing the air inlet opening between it and the first inlet air horn 222 and starving the outer most region of propeller 122. If desired, the inlet lip 123 can be inflated with pressurized air from the compressor 36 described above. This reduces propeller noise. To avoid requiring an excessive increase in the inflatable lip diameter, first inlet air horn 222 is made with gradiently flexible material allowing warping to further restrict the air flow between leading edge 228 and shroud inlet lip. The warping of first inlet air horn 222 increases the air gap between it and the second inlet air horn 224, improving propeller efficiency in the middle region while reducing noise. The actual increase in inlet lip diameter due to inflation and the effective radius increase due to leading edge 228 coming in contact with shroud inlet lip 123 will increase propulsive force as all air flow is redirected over that surface and creates an increase in the forward lift component of the overall thrust. This will offset the direct loss of thrust which is a certain penalty for reducing noise by restricting air flow to the outer regions of the propeller 122.

In FIG. 22, the first inlet air horn 222 is slideably attached to the propeller shaft housing tube 30 of propeller 122. As first inlet air horn 222 slides toward shroud inlet lip 123 air inflow to the outer propeller regions and noise is reduced. Simultaneously, trailing edge 230 comes closer to propeller 122 and efficiency is improved due to less turbulence rushing toward the low pressure region created between trailing edge 230 and shroud interior wall 152. It will be readily apparent to and understood by those skilled in the art that there are a number of means to manipulate, redirect or starve air to the outer regions of the propeller to reduce noise.

Each of the mechanisms described above anticipate a loss of overall propulsive efficiency, but only an aggressive testing program will reveal the best combination of maximum noise reduction while obtaining minimum loss of thrust. In addition, a propeller 122 may be designed to carefully to co-operate with a specific inlet air horn dimension or configuration to reduce noise levels more completely and simultaneously retain higher power to thrust efficiency even at the most quiet setting.

Aerodynamic separation is a condition well known in the art. Specifically, when the laminar airflow across and around a rotary wing (such as a propeller 122) becomes turbulent it separates or the propeller "stalls" in specific regions. During separation the propulsive efficiencies of the propeller drop severely causing a loss in pressure differentials and, therefore, sound pressure and correspondingly noise. Separation can be designed into a propeller so regions separate at certain engine speed and inflow field conditions. Therefore, inflow field manipulation by inlet air horn 222 or any other devices may cooperate with designed separation temporarily for noise reduction and when appropriate be restored to maximum thrust and propulsive efficiency.

My invention anticipates improvements in fluid dynamics computer modeling to assist design improvements of this noise reducing system of shrouds, propellers, air horns, flow field manipulators, and acoustic materials to reduce noise to protect the long-term hearing of propulsion device users and the public. As materials advancements continue shrouds, ducts, duct covers, air horns, air outlet guards, flaps, baffles, movable or fixed, may be employed to temporarily mute or attenuate the noise level, then be returned to full and maximum thrust levels. As such, any means for reducing noise of the propulsion device will be considered to be part of the scope and within the general spirit of the present invention.

Figure 23:
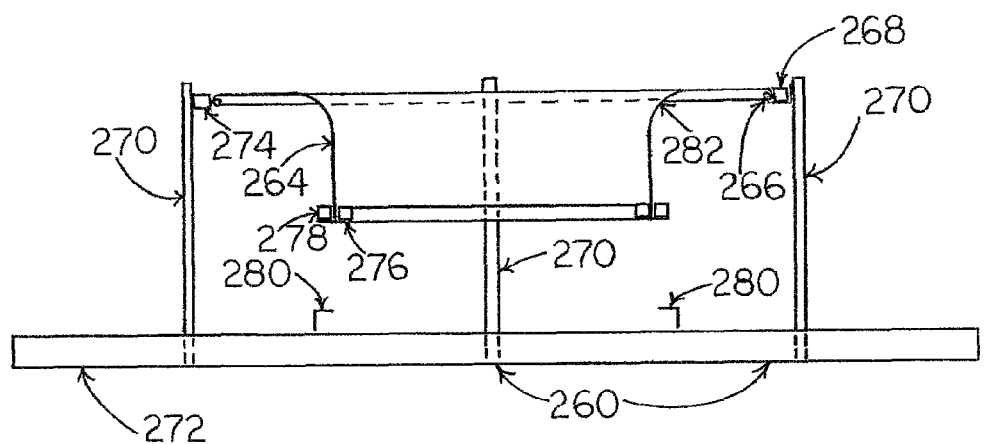
FIG. 23 is a side view of airhorn stretching fixture, fabric cylinder suspended.
Figure 24:
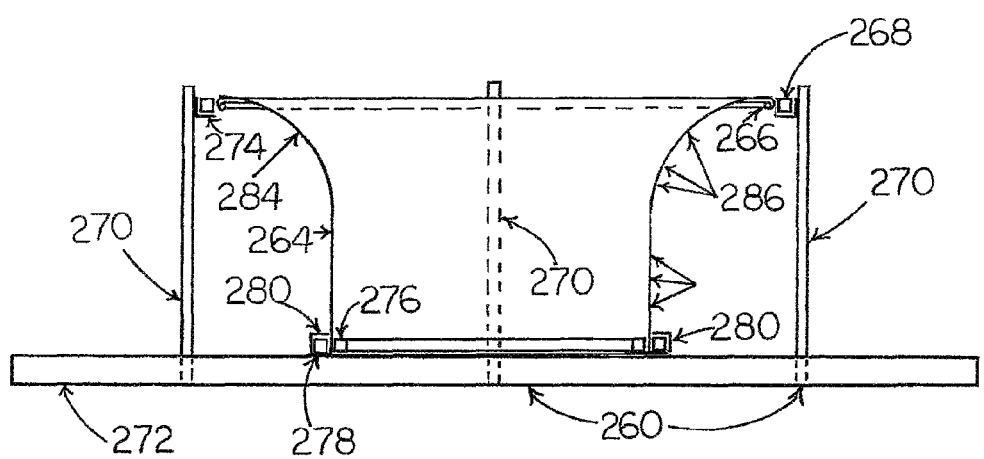
FIG. 24 is a side view of air horn stretching fixture fabric in final position.

Referencing FIG. 23, shroud inlet flow field manipulations require gradient flexibility of stretchable fabric cylinder 264 to be imparted on stretching fixture assembly 260 which is rotatably mounted to a table (not shown). The stretchable fabric cylinder 264 is stretched around a reinforcement hoop 266 of plastic or fiberglass selected to appropriately size the leading edge 228. After insuring stretchable fabric cylinder 264 is evenly positioned around reinforcement hoop 266, the large diameter clamp hoop 268 is positioned evenly around the outside of the assembly and tightened with a clamp screw or clamping device (not shown). A small diameter inner clamp hoop 276 is inserted into stretchable fabric cylinder 264, which was zigzag stitched to a size that lightly interferes with the insertion temporarily holding it in place. The small diameter outer clamp hoop 278 is tightened into position. The large diameter clamp hoop 268 is placed into large diameter clamp hoop supports 274, which were preadjusted on vertical adjustment rods 270 to achieve the desired (correct) shape. Vertical adjustment rods are slideably attached to fixture base plate 272 to accommodate various size combinations of large diameter clamp hoops 268. The small diameter outer hoop hold down clamps 280 are slideably attached to the fixture base plate 272 in preparation to receive and hold this specific size small diameter outer clamp hoop 278. The stretchable fabric cylinder 264 is flattened at the top by stretchable fabric tension and the unsecured bottom clamp assembly of the small diameter inner clamp hoop 276 and the small diameter outer clamp hoop 278 hang in mid air creating a small radius of relaxed fabric 282. FIG. 24 shows small diameter outer clamp hoop 278 fastened down by small diameter outer hoop hold down clamps 280, thereby, stretching the stretchable fabric cylinder 264 into the final predetermined design shape having large radius of stretched fabric 284.

The stretching fixture assembly 260 is then rotated manually or automatically while using brushes, rollers, or spray to apply a fixing hardening resin system. Any resin material system may be chosen for mechanical, heat, or water proofing properties. Foaming resins can be utilized to add thickness and acoustic deadening properties in one area of the part while a rigid and thin layer is applied to the rigid areas 288 where final part fasteners are anticipated. A siliconized or rubberized paint may be applied in the flexible areas 286. As can be readily appreciated by those skilled in the art, this material selection, thickness of application, and number of coats will generally be determined by pre-design requirements. The part may be for end use or stiffened with additional layers of high temperature epoxy resins and oven cured for use as a thermo-forming mold for end use part production. The gradient flexibility imparted by material selection and thickness of application is enhanced where no coating is applied and the stretchable fabric is fully flexible, stretchable, and available in a wide variety of colors and weights.

Figure 25:
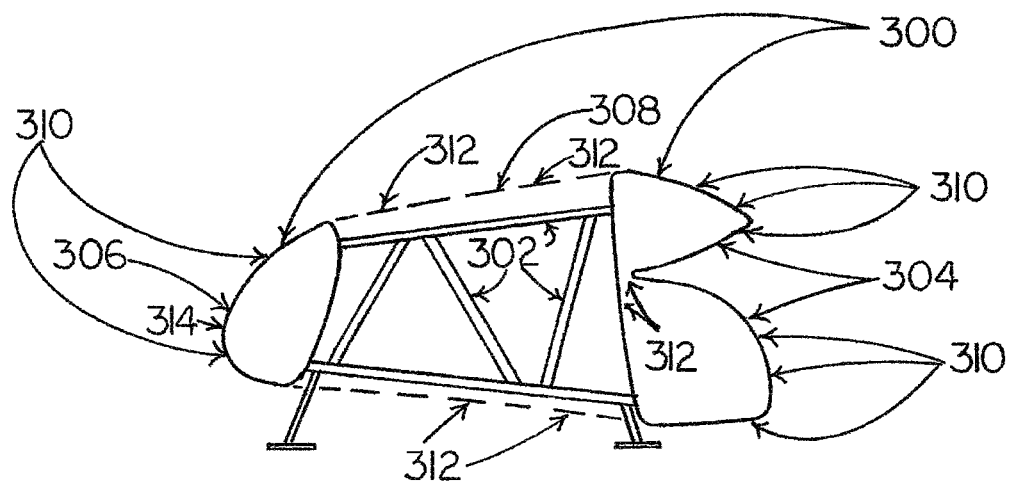
FIG. 25 is a side view of pre-stretched form for gradient stretchable bicycle fairing.

As will be readily appreciated by those skilled in the art, the gradient flexibility/gradient stretchability material and its method of creation create warpable air horns in many sizes, colors, and with various mechanical properties required in this unique application. Many other uses for gradient stretchability and gradient flexibility will become apparent. As an example, FIG. 25 shows a fabric stretching fixture 300 with an adjustable support frame 302 for the purpose of creating a gradient stretchable gradient flexible bicycle fairing, shown as 322 in FIG. 26. Precut and stitched stretchable fabric 308 is stretched over nose cone/front fender form 304 and positioned over rear wheel form 306 and areas of closures 314 are fastened. A suitable clear hardening resin material is applied to areas of rigidity 310 and thin spray layers of said resin in areas of flexibility 312. The resin should be clear to allow attractive stretchable fabric colors to show for decoration or safety/visibility. A water proofing on the top and upper regions will improve rider comfort in rain or fog and selection of a water proofing application process and material that doesn't impede untreated material stretchability is required. Multiple fabric panels of stretchable fabric of various colors may be included for logo design and/or decorations and on areas of rigidity 310 common paints can be applied to finish an attractive fairing 322.

Figure 26:
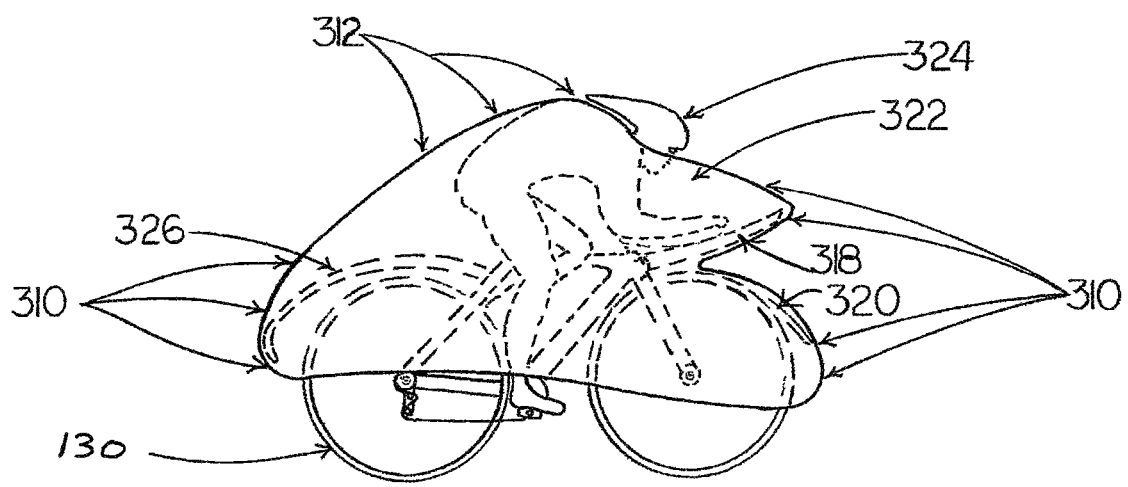
FIG. 26 is a side view of gradient stretchable fairing on a bicycle with a rider.

FIG. 26 shows a bicycle 130 having aerobars 328 with the bicycle rider in an aero position 324 and using a gradient stretchable fairing 322. The rider enjoys significantly reduced aerodynamic drag but can sit up if he desires due to areas of flexibility 312 across his back and shoulders and still with an improved aerodynamic profile. The areas of rigidity 310 are connected by untreated stretchable fabric and the nose cone area is rigidly attached to nose cone support bracket 318, and front fender support bracket 310 turns with the steering of the aero bars (not shown). The front wheel can be easily maneuvered allowed by the stretchable fabric in between nose cone areas of rigidity 310 and front fender area of rigidity 310 as it is left untreated and very stretchable but maintains an aerodynamically smooth shape in all steering positions. There is a slit on top of the fairing fabric (not shown) that allows easy rider partial exit to turn and reach and disconnect closures at areas of closures 314. The gradient stretchable fairing can be easily installed by positioning front areas of rigidity 310 over front fender support bracket 320 and with bicycle rider 324 standing straddling bicycle 328 stretches fairing over herself working shoulders through top slit and turning to stretch rear areas of rigidity 310 over rear support bracket 326. The system is designed so stretchable fabric tension alone holds the gradient stretchable fairing 322 in place but light weight closures of hook and loop, zippers, or the like can be included anywhere necessary. Never before has a rider been so smoothed aerodynamically with his bicycle 130 and yet the stretchability and flexibility allow the riders' elbows, knees, feet, shoulders and back to become part of the continuously changing fairing shape adding protection from weather, reducing rider fatigue, improving speed and range.

Those skilled in the art will readily appreciate that the gradient flexible/stretchable bicycle fairing 322 and method for creating gradient flexible stretchable material used therein, greatly increases the usefulness of any HPV with or without the use of a propulsion device. The front rigid areas of the faring 322 will absorb energy in a crash and are designed to crush against the rider improving crash safety.

Figure 27:
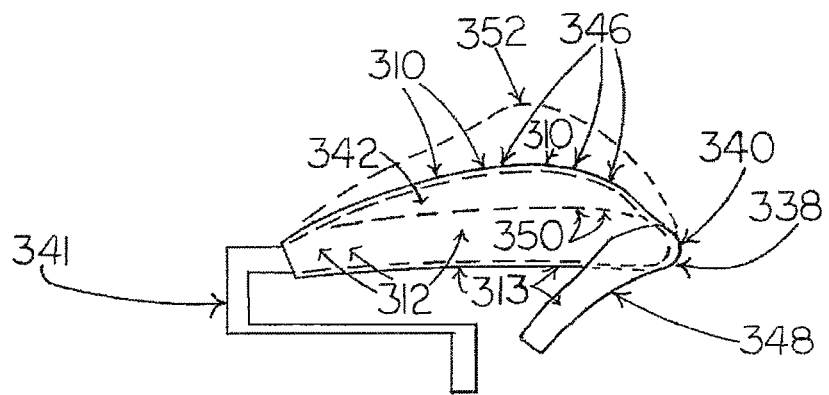
FIG. 27 is a side view of gradient flexible aeroshaping garment on a forming device.

FIG. 27 shows an aeroshaping garment 340 with gradient rigidity/flexibility and gradient stretchability imparted to the stretchable material. The stretchable fabric pre-stitched garment 338 is stretched onto aeroshaping garment form 342 with the aeroshaping garment form support arm 341 rotatably attached to a table (not shown). While rotating form 342, a suitable resin is lightly applied by roller, brush or spray on the areas of flexibility 312 and heavier on the areas of rigidity 310 and none on the untreated areas 313. Preferably, the stretchable fabric is brightly colored to improve the visibility of cyclists, runners, skiers and like users to others. When high speed is anticipated, such as when the garment is used with a propulsion device and bicycle, the optional larger aeroshaped region 352 would be chosen by the rider to further reduce wind resistance. The garment is sized for a snug fit of untreated areas 313 to hold the areas of rigidity 310 in place. The greater the distance between the human chest line 350 and the aero-shaped region 346 the more improved the aerodynamic performance and rider safety due to the energy absorption of the areas of rigidity 310 and the crush zone thereby provided. Foam fill (not shown) may be used to improve crush zone impact absorption. Storage compartments and access (not shown) may be incorporated.

As will be apparent to those skilled in the art, the gradient rigidity/flexibility and gradient stretchability imparted to aeroshape garments in this method increases rider safety, comfort and efficiency when he or she is on foot or on any HPV or ultra light aircraft where the operator/pilot is exposed to the airstream. Separate aeroshaping garments for the feet, head, legs, or arms are understood to be part of this aeroshaping garments and method for creating gradient flexibility/stretchability invention. Individual aeroshaped garments or a complete coverall is/are anticipated by this invention and material improvements of stretchable fabrics and resin properties will be utilized in the invention as they become available.

Figure 28:
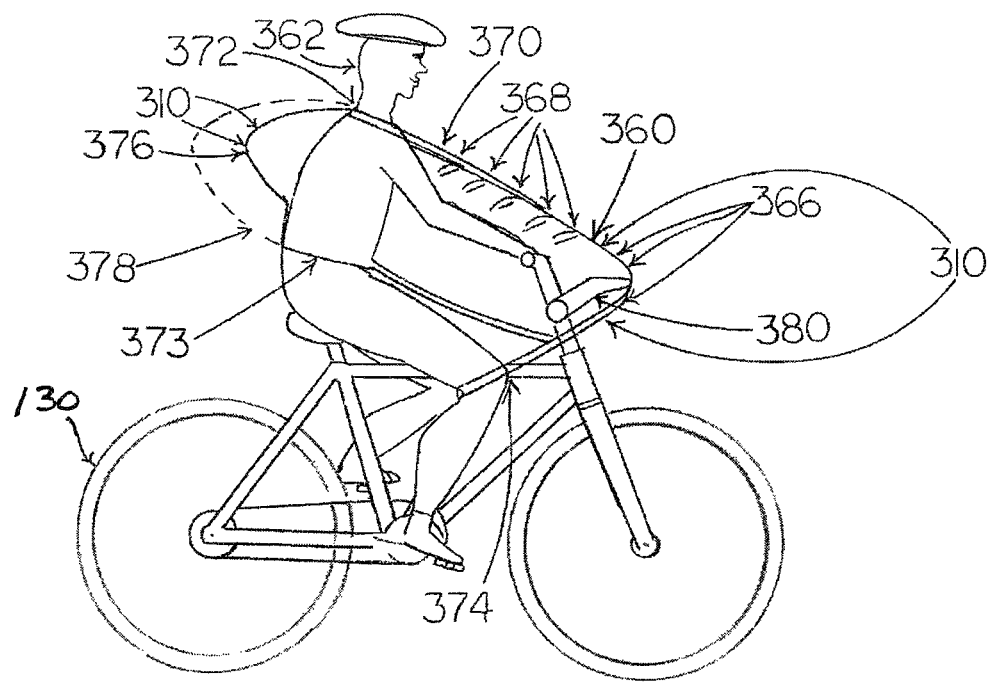
FIG. 28 is a side view of gradient flexible aeroshaping garment/fairing combination with bicycle and rider.

FIG. 28 shows a common bicycle 130 with a bicycle rider in upright position 362 wearing an aeroshaping garment/fairing combination 360. The rider 362 slips the aeroshaping garment/fairing combination 360 over her head and pulls it down until the garment/fairing waistband 373 is at her waist. Standing straddling the bicycle leaning forward, the rigid nose cone region 366 is placed over the aerobars 380 then the stretchable knee attachment 374 are fastened, one to each knee. As she sits upright the center collapsible aeroridge 370 is stretched and held into position by light fabric tension. The light tension of the knee attachments 374 counter the tension of the center aeroridge 370. The area of lateral semi-rigid banding 368 allows the dividing of wind and directing it around the rider but is completely collapsible due to gradient rigidity/flexibility and gradient stretchability imparted to the lateral banding region 368. The area of lateral semirigid banding 368, center collapsible aeroridge 370 and rigid nose cone region 366 cooperate to efficiently direct airflow around the bicycle handle bars, fork tube and rider. The rear aeroshaping area 376 reduces aerodrag behind the rider. An aeroshaping garment/fairing combination 360 with an optional increased rear aeroshape 378 would be selected for higher anticipated speeds or longer trips for further reduced aerodrag.

The aeroshaping garment/fairing combination 360 may be brightly colored for improved visibility in traffic and the upper portions treated to waterproof for rider comfort in rain. When removed from the rider the center collapsible aeroridge 370 allows rigid nose cone region 366 to be inserted into rear aero shaping area 376 for neat and compact storage.

Persons skilled in the art will appreciate that the garment/fairing combination utilizes gradient rigidity/flexibility and gradient stretchability to create a unique and significant improvement to the bicycle rider's comfort, and efficiency with a single piece of material. The garment/fairing combination may be configured for sail boats, canoes, ultra light aircraft and PPVs of all types, thereby improving their efficiency and usefulness.

Figure 29:
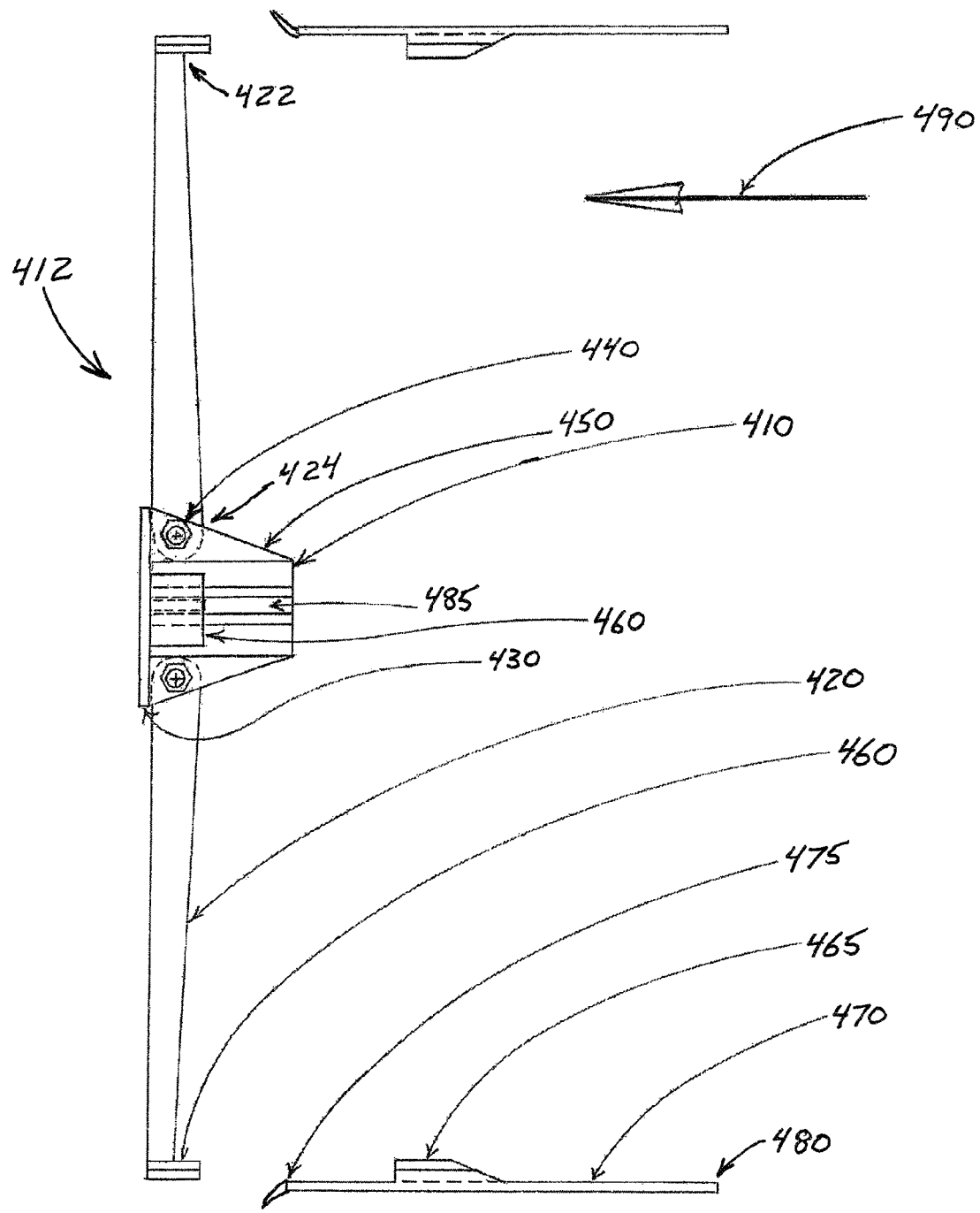
FIG. 29 is a side view of an alternative configuration of a shrouded propeller assembly that is configured to be collapsible, with the shroud shown in it assembled condition having the support struts fully extended and the propeller removed therefrom.
Figure 30:
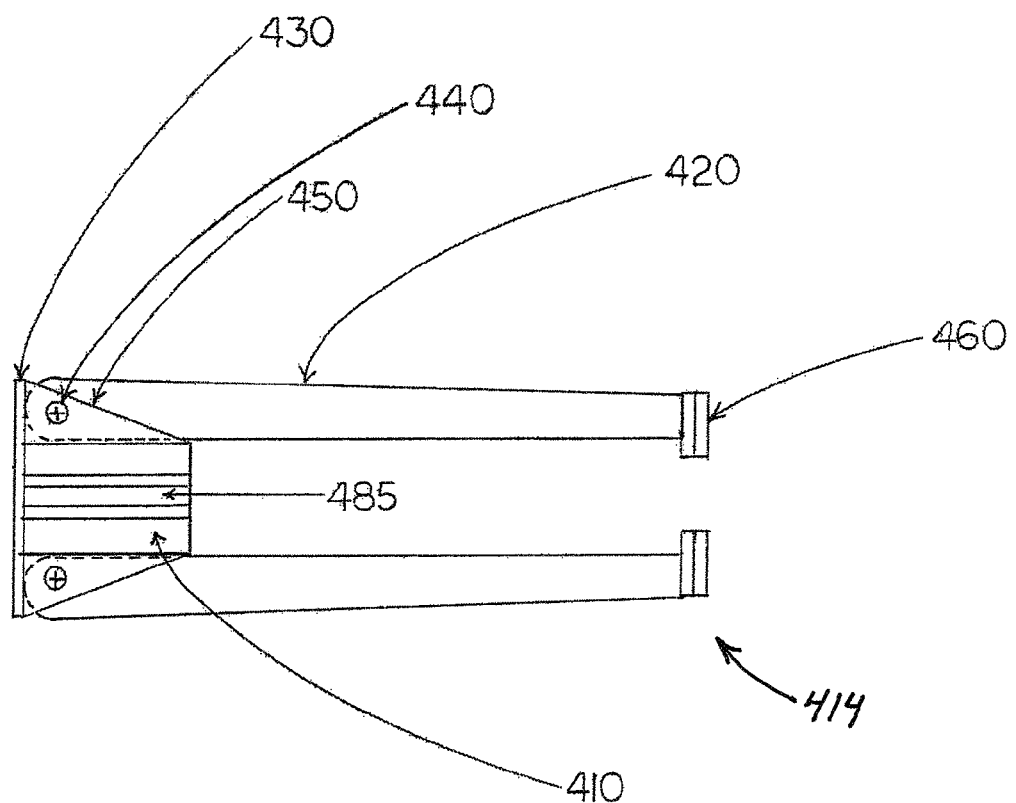
FIG. 30 is a side view of the shroud assembly of FIG. 29 shown with the shroud assembly collapsed to its collapsed condition.
Figure 31:
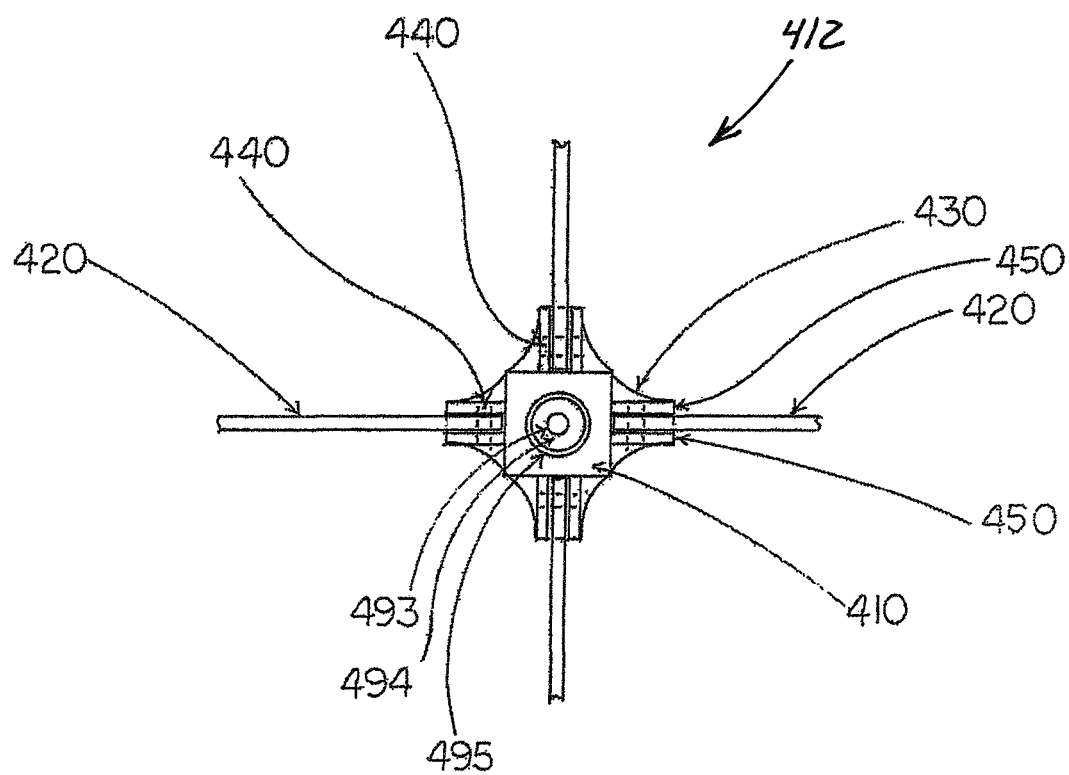
FIG. 31 is an end view of a shroud assembly shown in its extended condition, with the shroud assembly having four struts and shown without the shroud panels.
Figure 32:
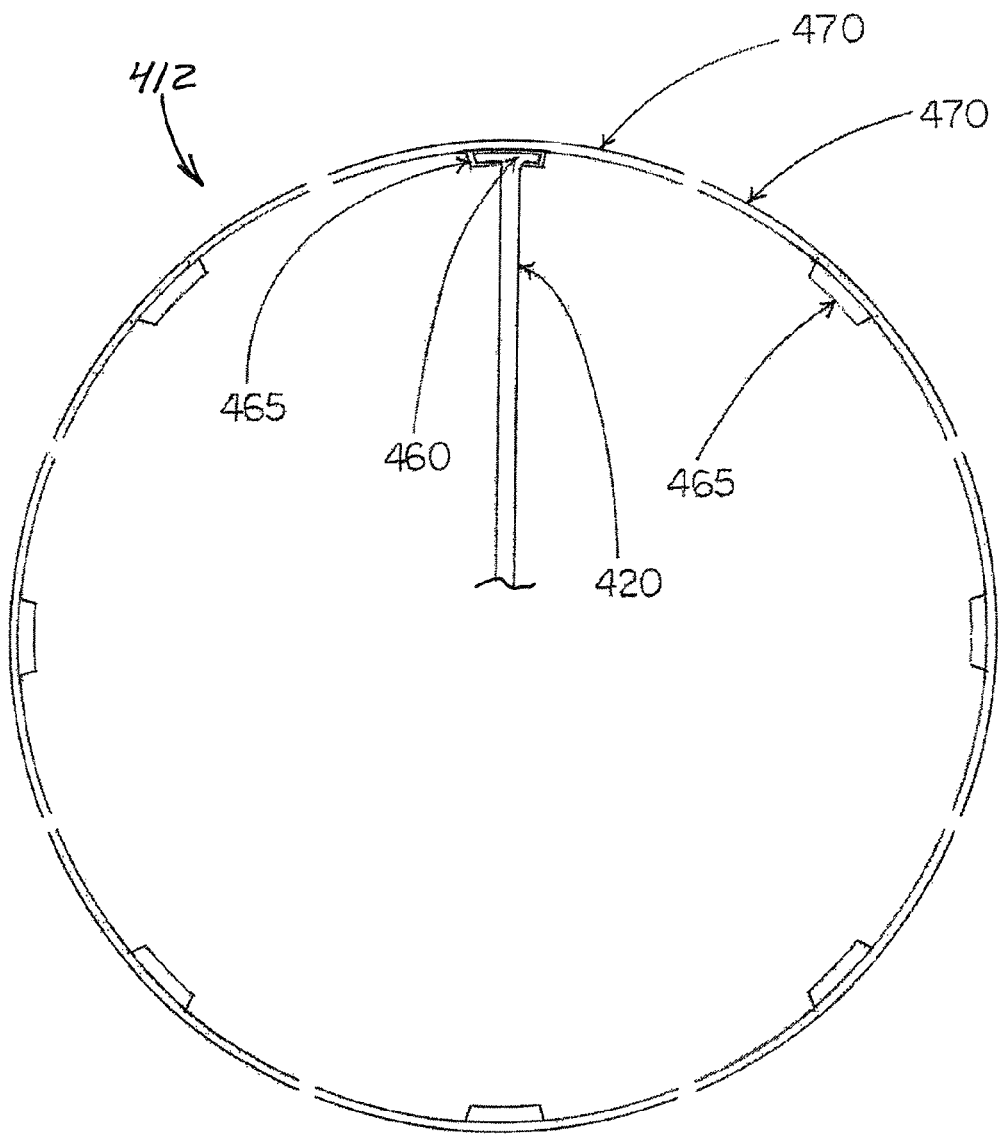
FIG. 32 is an end view of a shroud assembly shown in its assembled condition that is configured in the same manner as the shroud assembly of FIG. 32, with the shroud assembly of FIG. 32 being configured for use with eight support struts but with only one support strut shown and the bearing block and curved inlet lips not shown for simplicity.
Figure 33:
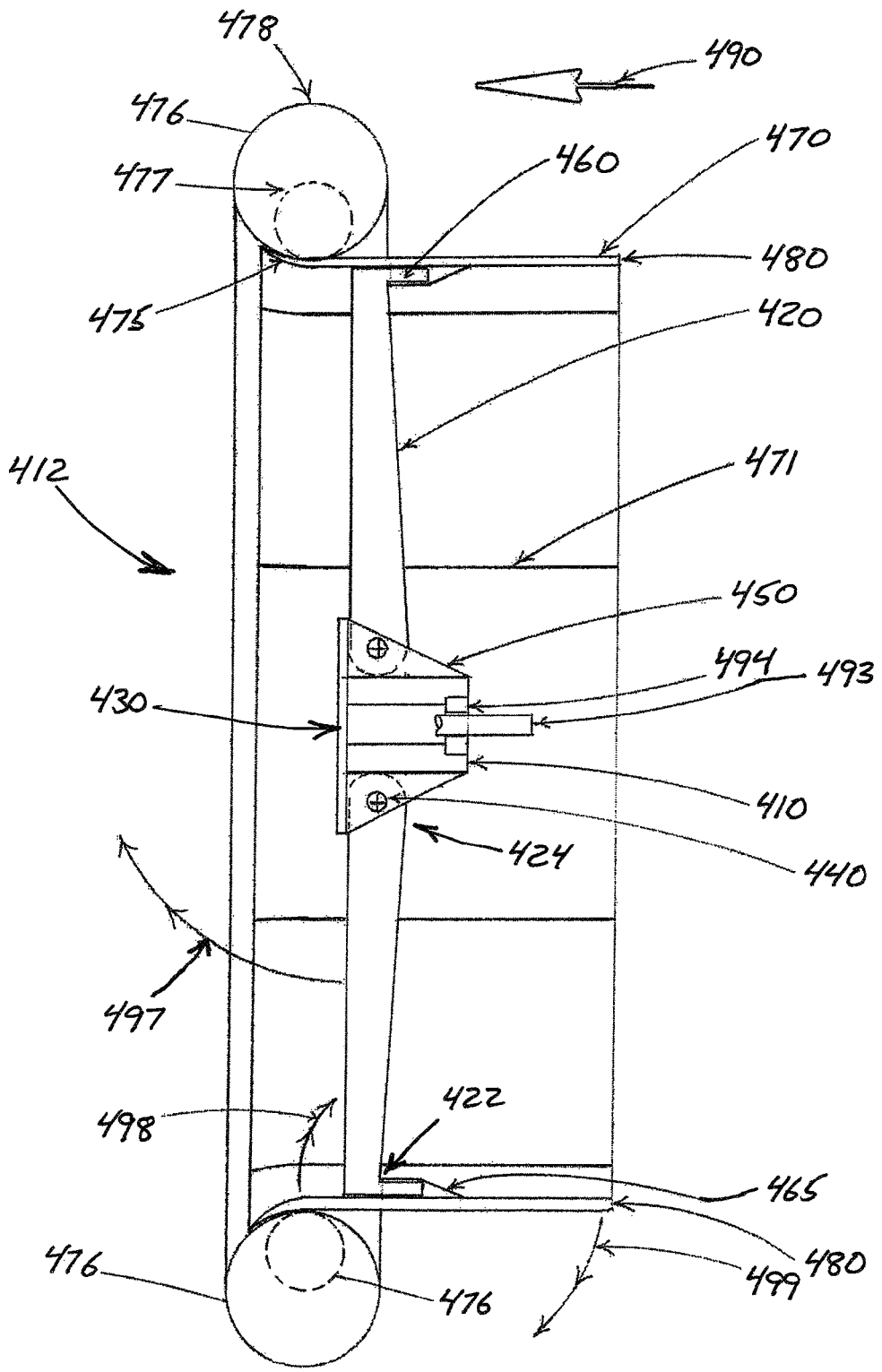
FIG. 33 is a side view of an alternative configuration of a shrouded propeller assembly that is configured to be collapsible, with the shroud shown in it assembled condition having the support struts fully extended, the propeller removed therefrom and utilizing an inflatable lip, shown in both the inflated and deflated condition, to compress the panels, bind the fittings and pre-load the support struts.

As shown in the embodiments of FIGS. 29 through 33, the personal propulsion device 11 of the present invention can utilize a collapsible shrouded propeller assembly 120. In these embodiments, the shrouded propeller assembly 120 has a shroud 124 that comprises a plurality of duct panels 470 that are each removably attached to one of the modified support struts, shown as 420, which are configured to be pivotally collapsible around a modified bearing block, shown as 410. As such, the shrouded propeller assembly 120 can be easily and quickly moved between its assembled condition 412, shown in FIGS. 29 and 31-33, and its collapsed condition 414, shown in FIG. 30. As best shown in FIGS. 29 and 32-33, in the embodiment shown in the figures the duct panel 470 is slidably removable from the insert plate 460 at the distal end 422 of the elongated support strut 420 and the proximal end 424 of the support strut 420 is pivotally attached to bearing block 410. Attached to, integral with or otherwise associated with each duct panel 470 is an insert plate fitting 465. In one embodiment, an interference fit is utilized between the insert plate fitting 465 and the insert plate 460 at the distal end 422 of the support strut 420 to ensure each duct panel 470 is held firmly in place when the insert plate 460 is slidably engaged with the insert plate fitting 465 of the duct panel 470. Each duct panel 470 has a slidably interlocking edge, not shown, that allows the user to join adjacent duct panels 470 together. The duct panel 470 is slidably interlocked while simultaneously aligning the insert plate fitting 465 with insert plate 460. Each adjacent duct panel 470 is attached to its adjacent duct panel 470 until the final duct panel 470 completes the continuous shroud 124 configured to have a generally smooth interior in line with the propeller tips, not shown. The strut pivot adjustment fastener 440 is adjusted to compress the clamp plates 450 against the pivot mounted strut 420 so as to maintain a firm friction fit. To ensure ease of assembly, all pivot mounted struts 420 must be pivoted tightly against the strut stop plate 430.

As shown in FIG. 30, in the collapsed condition 414 each of the pivot mounted struts 420 are rotated 90 degrees to the bottom of the strut slot 485 (best shown in FIG. 29). As a result, in the collapsed condition 414, the shroud 124 stores neatly with the duct panels 470 stacked, not shown, so as to be ready for storage or portaging. The propeller 122, which is not shown, is preferably of the type that is foldable for ease of storage and portage. The use and configuration of foldable propellers 122 that can be utilized with the personal propulsion device 11 are generally well known in the art. The collapsed assembly 120, folding propeller 122 and stacked duct panels 470 store neatly in a container attached to the power module 172, fanny pack or separate container.

The preferred configuration of the personal propulsion device 11 of the embodiments of FIGS. 29-33, utilizes an inflatable inlet lip 476, shown in FIG. 33. The inflatable inlet lip 476 is shown in broken lines in its deflated condition 477 and in a solid line it its inflated condition 478 in FIG. 33. In a preferred embodiment, the leading edge 475 of the duct panel 470 is curved to act as a resting plate for the inflatable inlet lip 476. The inlet lip 476 is filled with pressurized air to move from its deflated condition 477 to its inflated condition 478. If desired, the on-board diaphragm-type compressor 36, described above, can be utilized to fill the inflatable inlet lip 476. Alternatively, a CO2 cartridge or other source of compressed air can be utilized to fill the inflatable inlet lip 476 with air. In one embodiment, the inlet lip 476 is configured similar to an inner tube or the like. When inflated, the inlet lip 476 compresses the duct panels 470, binds the insert plate fittings 465 to the insert plates 460 and pre-loads the pivotally mounted struts 420 against strut stop plate 430. As will be readily appreciated by those skilled in the art, the leading edge 475 of the duct panels 470 are curved in a generally outward direction and in a manner so as to be cooperatively engaged with the inflatable inlet lip 476 when the shroud assembly 120 is placed in its extended condition 412. FIG. 31 is an end view of an assembled shroud assembly 120 showing use of four pivotally mounted struts 420, for use with four duct panels 470, shown without the duct panels 470 for ease of illustration. FIG. 32 is an end view of an assembled shroud assembly 120, with a full array of eight duct panels 470, showing insert plate 460 at distal end 422 of one of the pivotally mounted struts 420 slidably received in its respective insert plate fitting 465 (with the only one strut 420 shown modified bearing block 410 and the inflatable lip 476 not shown for simplicity of the illustration).

As shown in FIG. 33, as the deflated inflatable lip 476 is inflated to its inflated condition 478 it expands and exerts compression force on the leading edges 475 of the duct panels 470, as shown by force direction arrow 498. The cantilever compression after the inlet lip 476 is fully inflated to its inflated condition 478, it imparts a force indicated by force arrow 497 to the pivot mounted strut 420 against strut stop plate 430. In contrast, the trailing edges 480 of the duct panels 470 are conversely in outward tension, as indicated by force arrow 499. When fully inflated, the inflatable inlet lip 476 meets and cooperates with the leading edges 475 of the duct panels 470 to create a smooth surface for air flow and to tighten all components to avoid rattles and fretting wear. It will be readily understood by those skilled in the art that the collapsible shroud assembly 120 of the personal propulsion device 11 of the present invention has many advantages over fixed shroud assemblies and ducts.

In alternative embodiments, the shroud assembly 120 can comprise telescopically configured struts 420 or any slidably expanding struts to provide a shroud assembly 120 that achieves the collapsible objectives of the present invention. As exotic materials continue to improve and be available, the entire shroud 124 may be inflatable. The present invention anticipates this and other folding methods of size reduction of the personal propulsion device 11.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to various modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A personal propulsion device, comprising:
propulsion means for imparting thrust;
one or more controls operatively connected to said propulsion means and configured to control a throttle, start/stop operation and/or thrust direction of said propulsion means;
control means for controlling of said propulsion means, including thrust magnitude and/or direction of thrust from said propulsion means; and
a shrouded propeller assembly having a bearing block, a propeller operatively attached to said bearing block, a plurality of elongated support struts each having a proximal end attached to said bearing block and a shroud attached to a distal end of each of said support struts so as to dispose said shrouded propeller assembly in an extended condition with said shroud in spaced apart relation to said bearing block, said shroud having a plurality of duct panels, one of said plurality of duct panels connected to said distal end of one of said plurality of support struts,
wherein said device is configured to be worn by a user and to impart thrust directly to said user's back or to cooperatively engage a mounting means for securely mounting said device to a HPV instead of said user's back.

2. The personal propulsion device according to claim 1, wherein each of said support struts are pivotally attached to said bearing block so as to place said shrouded propeller assembly in a collapsed condition.

3. The personal propulsion device according to claim 1, wherein each of said duct panels are removably attached to said one of said plurality of support struts to place said shrouded propeller assembly in a collapsed condition with each of said duct panels removed from said support struts.

4. The personal propulsion device according to claim 3 further comprising an insert plate at the distal end of each of said support struts and an insert plate fitting attached to or integral with each of said duct panels, each of said insert plates and each of said insert plate fittings cooperatively sized and configured so one of said insert plates is slidably received in one of said insert plate fittings.

5. The personal propulsion device according to claim 4, wherein each of said duct panels is in slidably interlocking relationship with an adjacent duct panels.

6. The personal propulsion device according to claim 4, wherein each of said support struts are pivotally attached to said bearing block so as to place said shrouded propeller assembly in said collapsed condition.

7. The personal propulsion device according to claim 1 further comprises an inflatable inlet lip disposed around a leading edge of said support struts when said shrouded propeller assembly is in said extended condition, said inflatable inlet lip filled with pressurized air.

8. The personal propulsion device according to claim 7, wherein said inflatable lip is connected to a source of pressurized air associated with said personal propulsion device to place said inflatable lip in an inflated condition.

9. The personal propulsion device according to claim 8, wherein said source of pressurized air is a compressor operatively connected to said propeller.

10. The personal propulsion device according to claim 1, wherein said control means comprises a glove configured to receive one or more fingers therein, said glove operatively connected to said controls.

11. The personal propulsion device according to claim 1, wherein said propulsion means comprises a propulsion means module and a power means module operatively engaged with said propulsion means module and configured to supply power thereto, said propulsion means module removably attached to said power means module so as to facilitate interchangeability of said propulsion means module and/or said power means module.

12. The personal propulsion device according to claim 11, wherein said power means module is removable from said propulsion means module, said power means module engaged with a direct drive module configured to propel said HPV separate from the user's back.

13. A personal propulsion device, comprising:
propulsion means for imparting thrust directly to a user's back;
one or more controls operatively connected to said propulsion means and configured to control a throttle, start/stop operation and/or thrust direction of said propulsion means;
control means for hands free controlling of said propulsion means, including thrust magnitude and/or direction of thrust from said propulsion means, said control means comprising a glove configured to receive one or more fingers therein, said glove operatively connected to said controls; and
a shrouded propeller assembly having a bearing block, a propeller operatively attached to said bearing block, a plurality of elongated support struts each having a proximal end attached to said bearing block and a shroud attached to a distal end of each of said support struts so as to dispose said shrouded propeller assembly in an extended condition with said shroud in spaced apart relation to said bearing block, said shroud having a plurality of interconnected duct panels, one of said plurality of duct panels connected to said distal end of one of said plurality of support struts, each of said duct panels being removably attached to said one of said plurality of support struts so as to place said shrouded propeller assembly in a collapsed condition with each of said duct panels removed from said support struts.

14. The personal propulsion device according to claim 13, wherein each of said support struts are pivotally attached to said bearing block so as to place said shrouded propeller assembly in a collapsed condition with said support struts pivoted relative to said bearing block.

15. The personal propulsion device according to claim 14 further comprises an inflatable inlet lip disposed around a leading edge of said duct panels when said shrouded propeller assembly is in said extended condition, said inflatable inlet lip configured to be filled with pressurized air.

16. The personal propulsion device according to claim 13 further comprising an insert plate at the distal end of each of said support struts and an insert plate fitting attached to or integral with each of said duct panels, each of said insert plates and each of said insert plate fittings cooperatively sized and configured so one of said insert plates is slidably received in one of said insert plate fittings.

17. The personal propulsion device according to claim 13, wherein said propulsion means comprises a propulsion means module and a power means module operatively engaged with said propulsion means module and configured to supply power thereto, said propulsion means module removably attached to said power means module so as to facilitate interchangeability of said propulsion means module and/or said power means module.

18. The personal propulsion device according to claim 13, wherein said device is adapted to cooperatively engage a mounting means for securely mounting said device to a HPV instead of said user's back, said mounting means configured to support said device and propel the HPV.

\* \* \* \* \*